US011384863B2

(12) United States Patent
Hasegawa et al.

(10) Patent No.: US 11,384,863 B2
(45) Date of Patent: Jul. 12, 2022

(54) STEAM VALVE, POWER GENERATION SYSTEM, AND INSPECTION METHOD FOR STEAM VALVE

(71) Applicant: MITSUBISHI HEAVY INDUSTRIES, LTD., Tokyo (JP)

(72) Inventors: Noriyuki Hasegawa, Tokyo (JP); Kensuke Futahashi, Tokyo (JP); Megumu Tsuruta, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 205 days.

(21) Appl. No.: 16/697,539

(22) Filed: Nov. 27, 2019

(65) Prior Publication Data
US 2020/0208541 A1 Jul. 2, 2020

(30) Foreign Application Priority Data
Dec. 28, 2018 (JP) .............................. JP2018-247047

(51) Int. Cl.
*F16K 47/00* (2006.01)
*F16K 1/42* (2006.01)
(Continued)

(52) U.S. Cl.
CPC .............. *F16K 47/00* (2013.01); *F01D 17/10* (2013.01); *F16K 1/00* (2013.01); *F16K 1/42* (2013.01);
(Continued)

(58) Field of Classification Search
CPC ............. Y10T 137/87917; F01D 17/10; F01K 13/02; F16K 47/00; F16K 1/00;
(Continued)

(56) References Cited

U.S. PATENT DOCUMENTS

| 1,752,439 | A | * | 4/1930 | Larner | .................... | F16K 1/126 |
|---|---|---|---|---|---|---|
| | | | | | | 137/219 |
| 3,656,706 | A | * | 4/1972 | Johnston | ................ | F16K 31/363 |
| | | | | | | 251/38 |
| 4,060,453 | A | * | 11/1977 | Schabert | ................. | F16K 17/10 |
| | | | | | | 376/283 |
| 4,490,836 | A | * | 12/1984 | Grotloh | ................. | F01D 17/145 |
| | | | | | | 376/281 |
| 4,552,330 | A | * | 11/1985 | Grotloh | ............... | F16K 31/1223 |
| | | | | | | 251/25 |

(Continued)

FOREIGN PATENT DOCUMENTS

| CN | 105408587 | 3/2016 |
|---|---|---|
| CN | 109073094 | 12/2018 |

(Continued)

*Primary Examiner* — Jessica Cahill
(74) *Attorney, Agent, or Firm* — Wenderoth, Lind & Ponack, L.L.P.

(57) ABSTRACT

A steam valve has a tubular stop valve configured to move toward an upper end side and a lower end side along an axial direction when the stop valve is opened and closed respectively; and a valve main body configured to accommodate the stop valve. The stop valve has a ring-shaped protrusion portion protruded outwardly in a radial direction. The valve main body has an accommodation space for accommodating the protrusion portion which is divided by the protrusion portion into a first pressure space and a second pressure space. First and second feed/discharge portions configured for adjusting a pressure in the first pressure space and the second pressure space respectively are further provided. The protrusion portion is moved upwardly and downwardly by adjusting the pressure in the first pressure space and the second pressure space.

18 Claims, 17 Drawing Sheets

(51) Int. Cl.

| | |
|---|---|
| *F16K 31/122* | (2006.01) |
| *F16K 37/00* | (2006.01) |
| *F16K 1/44* | (2006.01) |
| *F16K 31/56* | (2006.01) |
| *F16K 31/383* | (2006.01) |
| *F16K 1/00* | (2006.01) |
| *F16K 27/02* | (2006.01) |
| *F01D 17/10* | (2006.01) |
| *F01K 13/00* | (2006.01) |
| *F01K 13/02* | (2006.01) |

(52) U.S. Cl.
CPC .............. *F16K 1/443* (2013.01); *F16K 27/02* (2013.01); *F16K 31/1223* (2013.01); *F16K 31/1226* (2013.01); *F16K 31/383* (2013.01); *F16K 31/56* (2013.01); *F16K 37/005* (2013.01); *F01K 13/003* (2013.01); *F01K 13/02* (2013.01)

(58) Field of Classification Search
CPC ............ F16K 1/42; F16K 1/443; F16K 27/02; F16K 31/1223; F16K 31/1226; F16K 31/383; F16K 31/56; F16K 37/005
See application file for complete search history.

(56) References Cited

U.S. PATENT DOCUMENTS

| | | | | |
|---|---|---|---|---|
| 5,934,870 | A * | 8/1999 | Zimmermann | F01D 17/145 |
| | | | | 415/157 |
| 5,971,018 | A | 10/1999 | Karlsson et al. | |
| 7,921,867 | B2 * | 4/2011 | Groves, II | F16K 3/265 |
| | | | | 137/87.04 |
| 10,087,773 | B2 * | 10/2018 | Kahl | F01D 17/10 |
| 10,480,662 | B2 * | 11/2019 | Futahashi | F16K 47/02 |
| 10,605,116 | B2 * | 3/2020 | Futahashi | F16K 31/1225 |
| 2006/0005889 | A1 * | 1/2006 | Takahashi | F16K 1/36 |
| | | | | 137/625.39 |
| 2012/0137688 | A1 * | 6/2012 | Batwal | F16K 1/443 |
| | | | | 60/660 |
| 2014/0124059 | A1 * | 5/2014 | McAuliffe | F16K 31/1223 |
| | | | | 137/492 |
| 2016/0169030 | A1 | 6/2016 | Kahl et al. | |
| 2019/0178388 | A1 * | 6/2019 | Hata | F16K 1/32 |

FOREIGN PATENT DOCUMENTS

| | | |
|---|---|---|
| DE | 2948639 | 6/1981 |
| JP | 8-254105 | 10/1996 |
| JP | 11-504102 | 4/1999 |
| JP | 4621553 | 1/2011 |
| JP | 2016-534289 | 11/2016 |
| JP | 6162335 | 7/2017 |

* cited by examiner

STEAM VALVE, POWER GENERATION SYSTEM, AND INSPECTION METHOD FOR STEAM VALVE

TECHNICAL FIELD

The present invention relates to a steam valve, a power generation system, and an inspection method for a steam valve.

Priority is claimed on Japanese Patent Application No. 2018-247047, filed on Dec. 28, 2018, the content of which is incorporated herein by reference.

BACKGROUND ART

A power generation system includes a steam turbine and a steam valve configured to adjust steam quantity according to load change and cut off supply of the steam when an abnormality has occurred.

A steam valve having a regulation valve, a stop valve, and a valve main body accommodating the stop valve and the regulation valve is disclosed in Patent Document 1.

The stop valve is formed in a tubular shape so as to surround the regulation valve, and the stop valve is configured to be movable along an axial direction of the steam valve. The stop valve has a tip end portion coming in contact with an inner surface of a valve seat, a base end portion, and a protrusion portion disposed between the tip end portion and the base end portion, wherein the protrusion portion is configured to protrude toward the outside of the tip end portion and the proximal end portion.

A first pressure space is formed at an upper side (base end portion side) in an axial direction of the protrusion portion. A second pressure space configured to be able to switch between a low pressure or a high pressure is formed at a lower side in the axial direction of the protrusion portion. The stop valve is configured to move along the axial direction by switching the pressure in the second pressure space.

The valve main body has the valve seat being in contact with the regulation valve and the tip end of the stop valve.

CITATION LIST

Patent Literature

[Patent Document 1] Japanese Patent No. 6162335

SUMMARY OF INVENTION

Technical Problem

However, the steam valve disclosed in Patent Document 1 does not have a mechanism configured to absorb the impact by the valve seat with respect to the stop valve at the time of rapid closure. Accordingly, at the time of rapid closure, the stop valve and the valve seat may be damaged.

In the situation of the steam valve disclosed in Patent Document 1, it is necessary to provide a switching mechanism for switching the pressure inside the second pressure space. When the switching mechanism is disposed at a position apart from the valve main body, it is possible to take a long time for switching the second pressure space from a high-pressure state to a low-pressure state.

However, when the switching mechanism is disposed near the valve main body, due to the effects of the heat from the steam valve, the switching mechanism may thermally deformed so as to lead to a malfunction of the switching mechanism.

In the steam valve disclosed in Patent Document 1, a mechanism configured to detect the operation failure (malfunction) of the stop valve and the regulation valve. Accordingly, it is difficult to detect the operation failure of at least one of the stop valve and the regulation valve.

An object of the present invention is to provide a steam valve and a power generation system so as to limit the damage to the stop valve and the valve seat at the time of rapid closure.

Another object of the present invention is to provide a steam valve and a power generation system so as to switch the second pressure space from a high-pressure state to a low-pressure state during a short period.

Further another object of the present invention is to provide an inspection method for detecting the operation failure in at least one of the stop valve and the regulation valve.

Solution to Problem

In order to solve the above-identified problem, a steam valve according to an embodiment of the present invention has a tubular stop valve, the stop valve being configured to move toward an upper end side along an axial direction when the stop valve is opened and move toward a lower end side along the direction of the axis when the stop valve is closed; and a valve main body configured to accommodate the stop valve while having a valve seat in contact with a tip end of the stop valve. The stop valve has a protrusion portion having a ring shape and configured to protrude outwardly in a radial direction orthogonal to the axial direction. The valve main body has an accommodation space for accommodating the protrusion portion. The accommodation space is divided by the protrusion portion into a first pressure space at an upper side of the protrusion portion and a second pressure space at a lower side of the protrusion portion. The steam valve further has a first feed/discharge portion configured to adjust a pressure in the first pressure space and a second feed/discharge portion configured to adjust a pressure in the second pressure space. The protrusion portion is moved upwardly and downwardly by adjusting the pressure in the first pressure space and the second pressure space.

According to the present invention, the steam valve has the first feed/discharge portion configured to adjust the pressure in the first pressure space and the second feed/discharge portion configured to adjust the pressure in the second pressure space so as to adjust the pressure in the first pressure space and the second pressure space. As a result, at the time of rapid closure, it is possible to make the distal end of the stop valve to slowly engage with the valve seat for limiting the damage of the stop valve and the valve seat.

In the steam valve according to an embodiment of the present invention, a circumference of the second pressure space may be surrounded by a first side wall configuring the valve main body. The first feed/discharge portion may be a flow passage formed in the stop valve and the first feed/discharge portion communicates with a steam flow path formed in the valve main body. The second feed/discharge portion may be formed in the first side wall, and the second feed/discharge portion may be a plurality of feed/discharge holes communicating the second pressure space with the outside of the second pressure space. The plurality of feed/discharge holes may be formed in the axial direction. The steam valve may further have a switching mechanism to selectively connect either of a high-pressure source with a pressure higher than that of the first pressure space or a low-pressure source with a pressure lower than that of the steam flowing in the steam flow passage to the second pressure space.

According to the present invention, the plurality of feed/discharge holes are formed in the axial direction and communicate the second pressure space with the outside of the second pressure space such that it is possible to decrease a sum of exposed aperture areas of the plurality of feed/discharge holes of the second pressure space when the stop valve moves toward the valve seat.

Accordingly, when the tip end of the stop valve approaches the valve seat, it is possible to make it difficult to discharge the steam in the second pressure space. In other words, when the tip end of the stop valve approaches the valve seat, it is possible to make a moving velocity of the tip end of the stop valve in the axial direction to be slow.

Accordingly, at the time of rapid closure, it is possible to make the distal end of the stop valve to slowly engage with the valve seat for limiting the damage of the stop valve and the valve seat.

In the steam valve according to an embodiment of the present invention, the stop valve may have a tip end portion and a base end portion, the tip end portion being in contact with the valve seat configuring the valve main body. The protrusion portion may be provided between the tip end portion and the base end portion. An aperture area of the plurality of feed/discharge holes may decrease from the base end portion side toward the tip end portion side of the stop valve.

As described above, by decreasing the aperture area of the plurality of feed/discharge holes from the base end portion side toward the tip end portion side of the stop valve, it is possible to make the moving velocity of the stop valve in the axial direction to be slow when the tip end of the stop valve moves toward the valve seat. As a result, it is possible to further limit the damage with respect to the stop valve and the valve seat.

In a steam valve according to an embodiment of the present invention, an aperture diameter of the plurality of feed/discharge holes may decrease from the base end portion side toward the tip end portion side of the stop valve.

Accordingly, by decreasing the aperture diameter of the plurality of feed/discharge holes from the base end portion side toward the tip end portion side of the stop valve, it is possible to make the moving velocity of the stop valve in the axial direction to be slow when the tip end of the stop valve moves toward the valve seat. As a result, it is possible to further limit the damage with respect to the stop valve and the valve seat.

In a steam valve according to an embodiment of the present invention, the valve main body may have a second side wall disposed at the outside of the plurality of feed/discharge holes formation region on which the plurality of feed/discharge holes are formed in the first side wall, wherein a penetration hole is formed on the second side wall; and a space communicating the penetration hole and the plurality of feed/discharge holes. The switching mechanism may have a piping having an end connecting with the penetration hole, a three-way valve connecting with the high-pressure source, the low-pressure source, and another end of the piping, and a throttle disposed on the piping.

According to such a configuration, since the space and the plurality of feed/discharge holes communicate with each other and one end of the piping configuring the switching mechanism is connected to the penetration hole formed on the second side wall, it is possible to supply the steam to the second pressure space and discharge the steam from the second pressure space.

Accordingly, it is not necessary to branch the piping with respect to each of the plurality of feed/discharge holes so as to simple the configuration of the switching mechanism.

In a steam valve according to an embodiment of the present invention, the valve main body may have a first member configured to partition the steam flow passage and has a first groove formed in the first member; and a second member configured to be attachable to the first member, wherein a second groove facing the first groove is formed in the second member. The first side wall may be separated from the first member and the second member, and a position of the first side wall may be restricted by being inserted into the first groove and the second groove.

As described above, by separating the first side wall, the first member, and the second member while configuring the first side wall to be easy to be attached to and detached from the first member and the second member, it is easy to exchange another first side wall in which the aperture diameter and configuration of the plurality of feed/discharge holes are different.

Accordingly, for example, in a case in which a test of the steam valve is performed using a fluid such as the air besides the steam, it is easy to exchange the first side wall in which the plurality of feed/discharge holes suitable for the air are formed. That is, it is easy to perform the test of the fluid besides the steam.

In a steam valve according to an embodiment of the present invention, the switching mechanism may have a main body portion having a first space connected with the high-pressure source and disposed at the valve main body side and a second space connected with the low-pressure source and disposed at an outside of the first space; a moving portion configured to be movable in a separation direction apart from the first space and the second space, wherein the moving portion communicates either of the first space or the second space with the plurality of feed/discharge holes due to the position to which the moving portion is moved; and a driving portion configured to move the moving portion in a direction from the second space toward the first space. The main body portion may be fixed to the valve main body such that the separation direction coincides with the radial direction.

As described above, by fixing the main body portion configuring the switching mechanism to the valve main body, it is easy to dispose the main body portion near the second pressure space. Accordingly, it is possible to switch the second pressure space from the high-pressure state to the low-pressure state during a short period.

Also, by coinciding the separation direction of the first space and the second space with the radial direction with respect to the axis, it is possible to limit the negative effects of the thermal deformation generated in the axial direction of the valve main body with respect to the main body portion and the moving portion. Accordingly, it is possible to limit the negative effects due to the thermal deformation of the valve main body with respect to the movement of the moving portion.

Therefore, it is possible to limit the negative effects due to the thermal deformation of the valve main body with respect to the movement of the moving portion, and further switch the second pressure space from the high-pressure state to the low-pressure state during a short period.

In a steam valve according to an embodiment of the present invention, the driving portion switching mechanism may be disposed at the outside of the second space in the radial direction, and the switching mechanism may have a spring portion configured to press an end of the moving portion disposed at the valve main body side toward the second space.

As described above, due to the spring portion configured to press an end of the moving portion disposed at the valve main body side toward the second space, when a malfunction has occurred in the driving portion, the second space connected with the low-pressure source is connected with the second pressure space. Accordingly, at the time when the malfunction has occurred in the driving portion, it is possible to limit the high-pressure steam supplied by the high-pressure source from flowing into the second pressure space so as to secure the safety of the steam valve.

In a steam valve according to an embodiment of the present invention, the valve main body may have a concave portion formed at the outside of the second pressure space and configured to make a part of the main body portion to approach the second pressure space.

As described above, by forming the concave portion at the outside of the second pressure space for making the main body portion to approach the second pressure space, it is possible to dispose the main body portion at a position nearer to the second pressure space. Thus, it is possible to switch the second pressure space from the high-pressure state to the low-pressure state in a short period of time.

In a steam valve according to an embodiment of the present invention, a gap or a thermal insulation material may be disposed between the concave portion and the main body portion.

As described above, by disposing the gap or the thermal insulation material between the concave portion and the main body portion, it is difficult for the heat of the valve main body to be transmitted to the main body portion so as to limit the thermal deformation of the main body portion.

In a steam valve according to an embodiment of the present invention, the switching mechanism may have a first three-way valve and a second three-way valve. Each of the first three-way valve and the second three-way valve may have a main body portion having a first space and a second space disposed at the valve main body side; a moving portion disposed inside the main body portion and configured to be movable in a separation direction apart from the first space and the second space; a driving portion configured to move the moving portion in a direction from the second space toward the first space; and a spring portion configured to press an end of the moving portion disposed at the valve main body side toward the second space. The main body portion may be directly fixed to the valve main body such that the separation direction coincides with the radial direction. The first space configuring the first three-way valve may be connected to the high-pressure source. The first space configuring the second three-way valve may communicate with the first space or the second space configuring the first three-way valve due to the position of the moving portion. The second space configuring the first three-way valve and the second space configuring the second three-way valve may be connected to the low-pressure source respectively. Either of the first space and the second space configuring the second three-way valve may communicate with the second pressure space due to the position of the moving portion.

According to the first three-way valve and the second three-way valve having such configurations, even in a situation in which the first three-way valve keeps the connection with the high-pressure source due to the malfunction of the first three-way valve, it is possible to make the second pressure space into the low-pressure state using the second three-way valve so as to close the stop valve.

Also, as described above, even in the situation in which the malfunction has occurred in the first three-way valve, the second three-way valve operates to limit the high-pressure steam from continuously flowing into the second pressure space, thus improve the safety of the steam valve.

In order to solve the above-identified problem, a power generation system according to an embodiment of the present invention has the steam valve, a boiler configured to generate steam; a steam turbine driven by the steam; and a steam supply piping configured to connect the boiler and the steam turbine to supply the steam to the steam turbine, wherein the steam valve is provided in the steam supply piping.

For example, at the time of rapid closure, due to the steam valve configured to be able to limit the damage with respect to the stop valve and the valve seat, it is possible to make the power generation system to operate stably.

For example, due to the steam valve configured to make the period until the stop valve moves toward the valve seat to be short, it is possible to improve the efficiency of the power generation system.

In order to solve the above-described problem, an inspection method for a steam valve according to an embodiment of the present invention, wherein the steam valve further has a regulation valve disposed at the inside of the stop valve and configured to be movable in the axial direction, has a process of putting the regulation valve into an opening state while making the stop valve into a close state; a process of determining a flow rate of steam flowing in a part positioned at the downstream side of the regulation valve in the steam flow passage formed in the valve main body; and a process of determining that an operation failure has occurred in the stop valve when the flow rate of the steam is not zero.

According to such processes, it is possible to determine whether a malfunction has occurred in the stop valve.

In order to solve the above-described problem, an inspection method for a steam valve according to an embodiment of the present invention is provided, wherein the steam valve further has a regulation valve disposed at the inside of the stop valve and configured to be movable in the axial direction, has a process of supplying the steam to an inlet port of the steam flow passage formed in the valve main body after opening the regulation valve in a state in which an open/close state of the stop valve is unknown; a process of determining a pressure at a position at the upstream side of the stop valve in the steam flow passage, a pressure at a position between the stop valve and the regulation valve in the steam flow passage, and a pressure at a position at the downstream side of the regulation valve in the steam flow passage, and a process of estimating an aperture area $A_1$ of the stop valve according to the three determined pressures and following Equation (1): $M_1 = C_1 \cdot A_1 \cdot f(p_0, p_1)$ and Equation (2): $M_2 = C_2 \cdot f(St) \cdot f(p_1, p_2)$, wherein $M_1$ represents a mass flow rage of the steam passing through the stop valve, $M_2$ represents a mass flow rate of the steam passing through the regulation valve, $C_1$ represents a flow rate characteristic of the stop valve acquired in advance, $C_2$ represents a flow rate characteristic of the regulation valve acquired in advance, $A_1$ represents the aperture area of the stop valve, St represents a stroke of the regulation valve, $p_0$ represents the pressure at the position at the upstream side of the stop valve in the steam flow passage, $p_1$ represents the pressure at the position between the stop valve and the regulation valve in the steam flow passage, and $p_2$ represents the pressure at the position at the downstream side of the regulation valve in the steam flow passage.

According to such processes, by estimating the aperture area $A_1$ of the stop valve, it is possible to estimate the open/close state of the stop valve according to the aperture area $A_1$ of the stop valve.

In order to solve the above-described problem, an inspection method for a steam valve, wherein the steam valve further has a regulation valve disposed at the inside of the stop valve and configured to be movable in the axial direction, has a process of rapidly closing the stop valve and the regulation valve; a process of monitoring a change of a pressure in the steam flow passage formed in the valve main body and between the stop valve and the regulation valve immediately after rapidly closing the stop valve and the regulation valve; and a process of determining that an operation failure has occurred in the stop valve when the pressure in the steam flow passage approaches the pressure of the boiler, and determining that an operation failure has occurred in the regulation valve when the pressure in the steam flow passage approaches the pressure of the steam turbine.

According to such processes, at the time of rapidly closure, it is possible to estimate whether a leakage has occurred in the stop valve and the regulation valve. Accordingly, it is possible to determine whether malfunction has occurred in the stop valve and the regulation valve.

In order to solve the above-described problem, a steam valve according to an embodiment of the present invention has a tubular stop valve, the stop valve being configured to move toward an upper end side along an axial direction when the stop valve is opened and move toward a lower end side along the direction of the axis when the stop valve is closed; and a valve main body configured to accommodate the stop valve. The stop valve has a protrusion portion having a ring shape and configured to protrude outwardly in a radial direction orthogonal to the axial direction. The valve main body has an accommodation space for accommodating the protrusion portion and a steam flow passage for the steam to flow. The accommodation space is divided by the protrusion portion into a first pressure space at an upper side of the protrusion portion and a second pressure space at a lower side of the protrusion portion. A first feed/discharge portion configured to adjust a pressure in the first pressure space and a second feed/discharge portion configured to adjust a pressure in the second pressure space are further provided.

A circumference of the second pressure space is surrounded by a first side wall configuring the valve main body.

The second feed/discharge portion is formed in the first side wall, and the second feed/discharge portion is a plurality of feed/discharge holes communicating the second pressure space with the outside of the second pressure space. The plurality of feed/discharge holes are formed in the axial direction. A switching mechanism is further provided and selectively connects one of a high-pressure source with a pressure higher than that of the first pressure space and a low-pressure source with a pressure lower than that of the steam flowing in the steam flow passage to the second pressure space. The switching mechanism has a main body portion having a first space connected with the high-pressure source and disposed at the valve main body side and a second space connected with the low-pressure source and disposed at an outside of the first space; a moving portion configured to be movable in a separation direction apart from the first space and the second space, wherein the moving portion communicates either of the first space or the second space with the plurality of feed/discharge holes due to the position to which the moving portion is moved; and a driving portion configured to move the moving portion in a direction from the second space toward the first space. The main body portion is fixed to the valve main body such that the separation direction coincides with the radial direction.

According to the present invention, by fixing the main body portion configuring the switching mechanism to the valve main body, it is possible to dispose the main body portion near the second pressure space. Accordingly, it is possible to switch the second pressure space from the high-pressure state to the low-pressure state in a short period of time.

Also, by coinciding the separation direction of the first space and the second space with the radial direction with respect to the axis, it is possible to limit the negative effects due to the thermal deformation of the valve main body with respect to the movement of the moving portion.

Therefore, it is possible to limit the negative effects due to the thermal deformation of the valve main body with respect to the movement of the moving portion, and further switch the second pressure space from the high-pressure state to the low-pressure state during a short period.

In a steam valve according to an embodiment of the present invention, the driving portion may be disposed at the outside of the second space in the radial direction, and the switching mechanism may have a spring portion configured to press an end of the moving portion disposed at the valve main body side in a direction toward the second space.

As described above, due to the spring portion configured to press an end of the moving portion disposed at the valve main body side toward the second space, when a malfunction has occurred in the driving portion, the second space connected with the low-pressure source is connected with the second pressure space. Accordingly, at the time when the malfunction has occurred in the driving portion, it is possible to limit the high-pressure steam supplied by the high-pressure source from flowing into the second pressure space so as to secure the safety of the steam valve.

In a steam valve according to an embodiment of the present invention, the valve main body may have a concave portion formed at the outside of the second pressure space and configured to make a part of the main body portion to approach the second pressure space.

As described above, by forming the concave portion at the outside of the second pressure space for making the main body portion to approach the second pressure space, it is possible to dispose the main body portion at a position nearer to the second pressure space. Thus, it is possible to switch the second pressure space from the high-pressure state to the low-pressure state in a short period of time.

In a steam valve according to an embodiment of the present invention, a gap or a thermal insulation material may be disposed between the concave portion and the main body portion.

As described above, by disposing the gap or the thermal insulation material between the concave portion and the main body portion, it is difficult for the heat of the valve main body to be transmitted to the main body portion so as to limit the thermal deformation of the main body portion.

In a steam valve according to an embodiment of the present invention, instead of the switching mechanism, a first three-way valve and a second three-way valve may be provided, wherein each of the first three-way valve and the second three-way valve has a main body portion having a first space and a second space disposed at the valve main body side; a moving portion disposed inside the main body portion and configured to be movable in a separation direction apart from the first space and the second space; a driving portion configured to move the moving portion in a direction from the second space toward the first space; and a spring portion configured to press an end of the moving portion disposed at the valve main body side toward the second space. The main body portion may be directly fixed to the valve main body such that the separation direction coincides with the radial direction. The first space configuring the first three-way valve may be connected to the high-pressure source. The first space configuring the second three-way valve may communicate with the first space or the second space configuring the first three-way valve due to the position of the moving portion. The second space configuring the first three-way valve and the second space configuring the second three-way valve may be connected to the low-pressure source respectively. Either of the first space and the second space configuring the second three-way valve may communicate with the second pressure space due to the position of the moving portion.

According to the first three-way valve and the second three-way valve having the above-described configurations, even if the first three-way valve is in the state in which the first space thereof is connected to the high-pressure source, it is possible to close the stop valve using the second three-way valve so as to improve the safety.

In order to solve the problem, an inspection method for a steam valve according to an embodiment of the present invention, wherein the steam valve has a tubular stop valve, the stop valve being configured to move toward an upper end side along an axial direction when the stop valve is opened and move toward a lower end side along the direction of the axis when the stop valve is closed, a regulation valve disposed at the inside of the stop valve and configured to be movable in the axial direction, and a valve main body configured to accommodate the stop valve, wherein the stop valve has a protrusion portion having a ring shape and configured to protrude outwardly in a radial direction orthogonal to the axial direction, the valve main body has an accommodation space for accommodating the protrusion portion and a steam flow passage for the steam to flow, the accommodation space is divided by the protrusion portion into a first pressure space at an upper side of the protrusion portion and a second pressure space at a lower side of the protrusion portion, and the steam flow passage formed in the valve main body communicates with the first pressure space via the flow passage formed in the stop valve, has a process of making the regulation valve into an opening state while making the stop valve into an close state; a process of determining a flow rate of steam flowing in a part positioned at the downstream side of the regulation valve in the steam flow passage formed in the valve main body; and a process of determining that an operation failure has occurred in the stop valve when the flow rate of the steam is not zero.

Due to such processes, it is possible to determine whether a malfunction has occurred in the stop valve.

In order to solve the problem, an inspection method for a steam valve according to an embodiment of the present invention, wherein the steam valve has a tubular stop valve, the stop valve being configured to move toward an upper end side along an axial direction when the stop valve is opened and move toward a lower end side along the direction of the axis when the stop valve is closed, a regulation valve disposed at the inside of the stop valve and configured to be movable in the axial direction, and a valve main body configured to accommodate the stop valve, wherein the stop valve has a protrusion portion having a ring shape and configured to protrude outwardly in a radial direction orthogonal to the axial direction, the valve main body has an accommodation space for accommodating the protrusion portion and a steam flow passage for the steam to flow, the accommodation space is divided by the protrusion portion into a first pressure space at an upper side of the protrusion portion and a second pressure space at a lower side of the protrusion portion, and the steam flow passage formed in the valve main body communicates with the first pressure space via the flow passage formed in the stop valve, has a process of supplying the steam to an inlet port of the steam flow passage formed in the valve main body after opening the regulation valve in a state in which an open/close state of the stop valve is unknown; a process of determining a pressure at a position at the upstream side of the stop valve in the steam flow passage, a pressure at a position between the stop valve and the regulation valve in the steam flow passage, and a pressure at a position at the downstream side of the regulation valve in the steam flow passage, and a process of estimating an aperture area A1 of the stop valve according to the three determined pressures and following Equation (3): $M1=C1 \cdot A1 \cdot f(p0, p1)$ and Equation (4): $M2=C2 \cdot f(St) \cdot f(p1, p2)$, wherein M1 represents a mass flow rage of the steam passing through the stop valve, M2 represents a mass flow rate of the steam passing through the regulation valve, C1 represents a flow rate characteristic of the stop valve acquired in advance, C2 represents a flow rate characteristic of the regulation valve acquired in advance, A1 represents the aperture area of the stop valve, St represents a stroke of the regulation valve, p0 represents the pressure at the position at the upstream side of the stop valve in the steam flow passage, p1 represents the pressure at the position between the stop valve and the regulation valve in the steam flow passage, and p2 represents the pressure at the position at the downstream side of the regulation valve in the steam flow passage.

According to the present invention, due to the above-described processes, the open/close state of the stop valve can be estimated according to the aperture area $A_1$ of the stop valve.

In order to solve the problem, an inspection method for a steam valve according to an embodiment of the present invention, wherein the steam valve has a tubular stop valve, the stop valve being configured to move toward an upper end side along an axial direction when the stop valve is opened and move toward a lower end side along the direction of the axis when the stop valve is closed, a regulation valve disposed at the inside of the stop valve and configured to be movable in the axial direction, and a valve main body configured to accommodate the stop valve, wherein the stop valve has a protrusion portion having a ring shape and configured to protrude outwardly in a radial direction orthogonal to the axial direction, the valve main body has an accommodation space for accommodating the protrusion portion and a steam flow passage for the steam to flow, the accommodation space is divided by the protrusion portion into a first pressure space at an upper side of the protrusion portion and a second pressure space at a lower side of the protrusion portion, and the steam flow passage formed in the valve main body communicates with the first pressure space via the flow passage formed in the stop valve, has a process of rapidly closing the stop valve and the regulation valve; a process of monitoring a change of a pressure in the steam flow passage formed in the valve main body and between the stop valve and the regulation valve immediately after rapidly closing the stop valve and the regulation valve; and a process of determining that an operation failure has occurred in the stop valve when the pressure in the steam flow passage approaches the pressure of the boiler, and determining that an operation failure has occurred in the regulation valve when the pressure in the steam flow passage approaches the pressure of the steam turbine.

According to the present invention, due to the above-described processes, at the time of rapid closure, it is possible to estimate whether leakage has occurred in either of the stop valve and the regulation valve.

Advantageous Effects of Invention

According to the present invention, the damage of the stop valve and the valve seat can be limited at the time of rapid closure.

According to the present invention, it is possible to switch the second pressure space from the high-pressure state to the low-pressure state in a short period of time.

According to the present invention, it is possible to detect the malfunction occurred in either of the stop valve or the regulation valve.

DESCRIPTION OF EMBODIMENTS

Hereinafter, embodiments to which the present invention is applied will be described in detail with reference to the drawings.

First Embodiment

Figure 1:
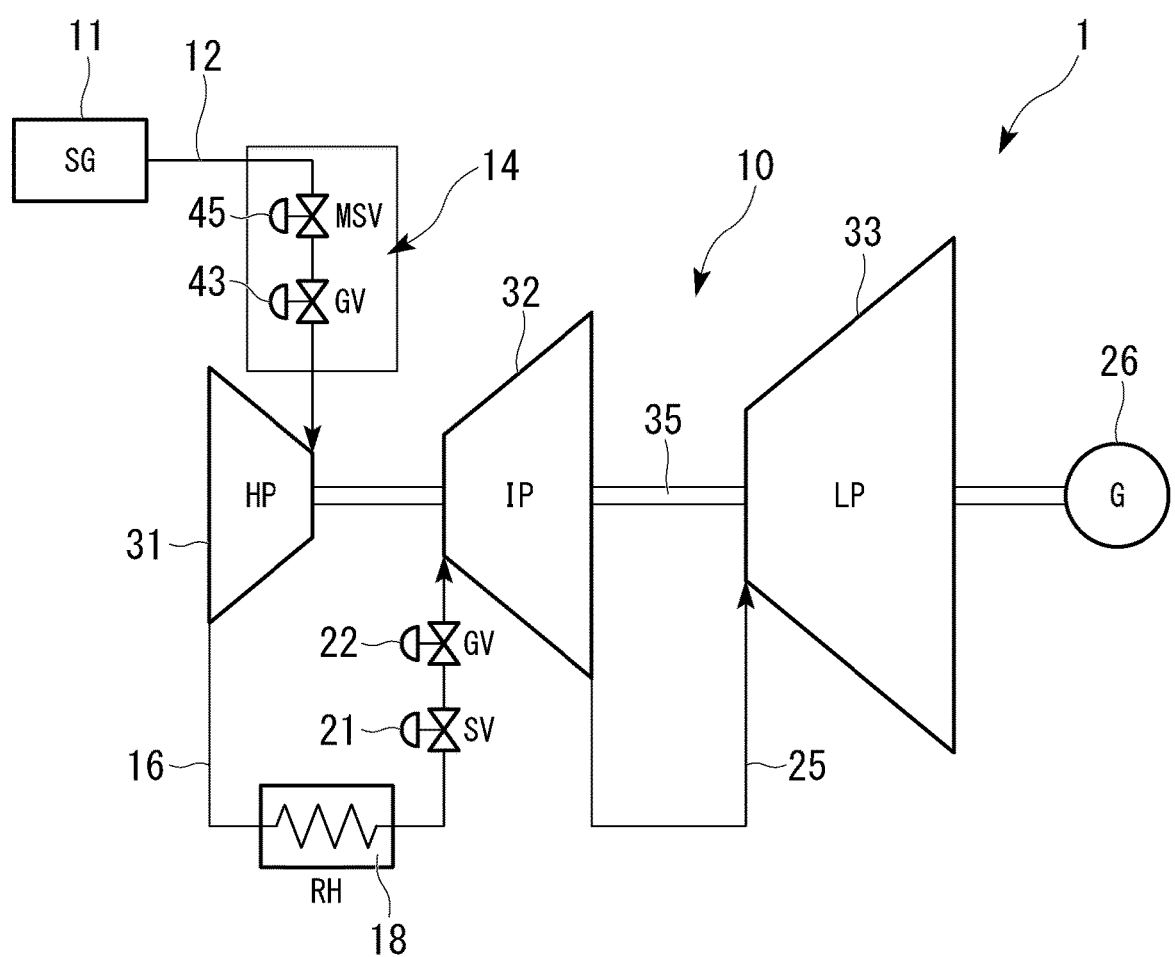
FIG. 1 is a systematic view showing a schematic configuration of a power generation system according to a first embodiment of the present invention.

A power generation system 1 including a steam turbine 10 according to a first embodiment of the present invention will be described with reference to FIG. 1.

The power generation system 1 includes the steam turbine 10, a boiler 11, a first steam supply piping (steam supply piping) 12, a steam valve 13 including a regulation valve 43 and a stop valve 45, a second steam supply piping 16, a reheater 18, a stop valve 21, a regulation valve 22, a third steam supply piping 25, and a generator 26.

The steam turbine 10 includes a high-pressure steam turbine 31, a middle-pressure steam turbine 32, and a low-pressure steam turbine 33. The middle-pressure steam turbine 32 is disposed between the high-pressure steam turbine 31 and the low-pressure steam turbine 33.

The high-pressure steam turbine 31, the middle-pressure steam turbine 32, and the low-pressure steam turbine 33 have a rotation shaft 35 extent along one direction. The rotation shaft 35 has a rotation axis main body and a plurality of rotor vanes (not shown) formed therein.

The rotation shaft 35 is rotated due to the steam supplied to the high-pressure steam turbine 31, the middle-pressure steam turbine 32, and the low-pressure steam turbine 33 so as to generate electric power.

The boiler 11 is connected to an end of the first steam supply piping 12. The boiler 11 is configured to generate the steam with a high pressure (hereinafter described as "high-pressure steam"). The high-pressure steam generated by the boiler 11 is supplied to the inside of the first steam supply piping 12.

The first steam supply piping 12 has another end connected to an inlet of the high-pressure steam turbine 31. The first steam supply piping 12 is the piping configured to lead the high-pressure steam generated in the boiler 11 to the high-pressure steam turbine 31.

Figure 2:
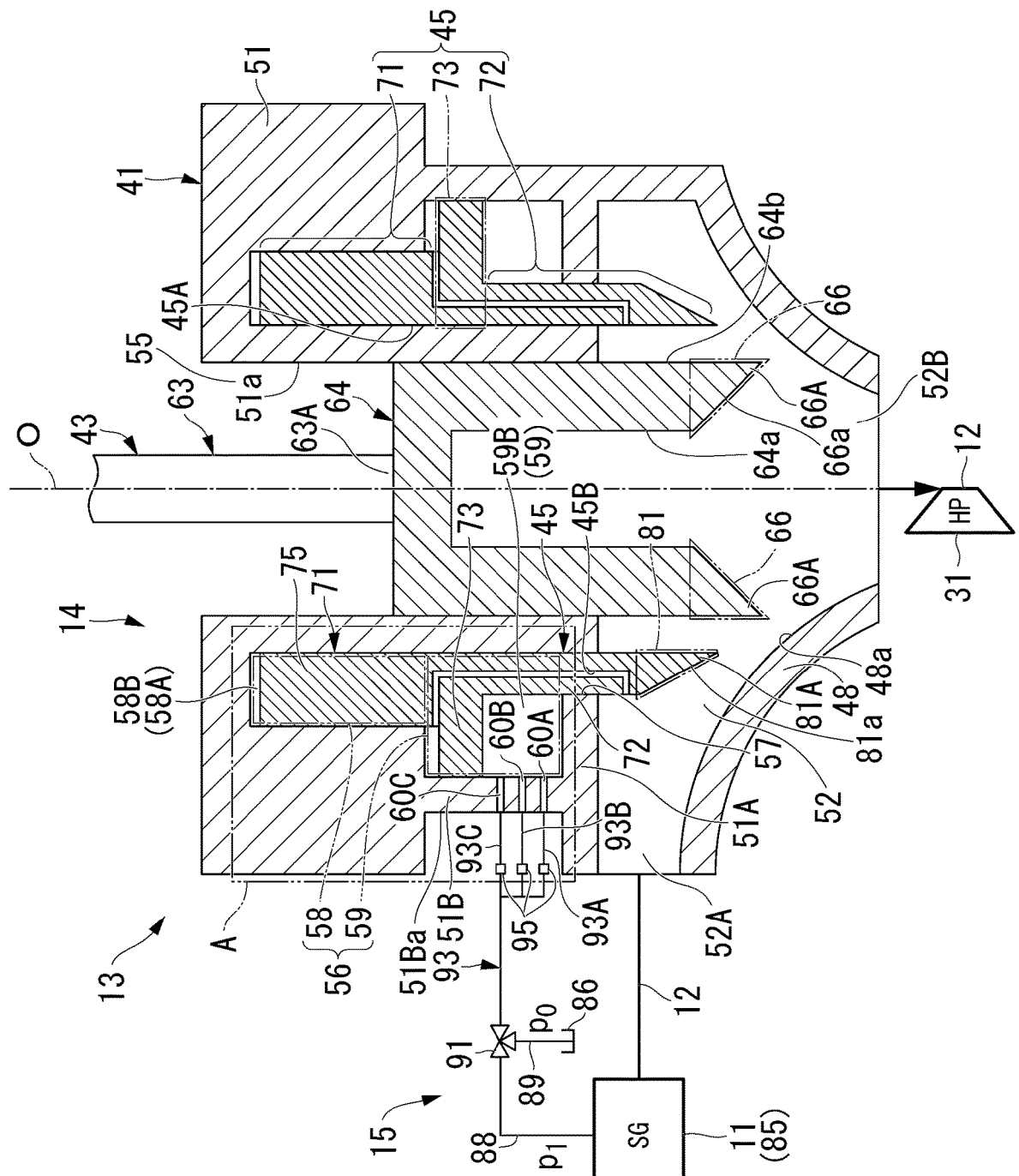
FIG. 2 is a sectional view of the steam valve in FIG. 1, schematically showing that both of the stop valve and the regulation valve are in a full open state.

Next, the steam valve 13 will be described with reference to FIGS. 1-5. In FIG. 2, reference signs "A" and "O" indicate a region (hereinafter described as "region A") and an axis (hereinafter described as "axis O") of the steam valve 13 respectively. In FIGS. 1-5, the same configuration elements will be assigned with same reference signs.

The steam valve 13 is disposed on the first steam supply piping 12. The steam valve 13 has a steam valve main body 14 and a switching mechanism 15.

The steam valve main body 14 has a valve main body 41, a regulation valve 43, and a stop valve 45.

The valve main body 41 has a valve seat 48, a valve accommodation member 51, and a steam flow passage 52.

The valve seat 48 has an inner surface 48a, wherein tip ends of the regulation valve 43 and the stop valve 45 contact with the inner surface 48a. The inner surface 48a is formed as a curved surface. The inner surface 48a partitions a part of the steam flow passage 52.

The valve accommodation member 51 is disposed at the valve seat 48 in a state in which the steam flow passage 52 can be partitioned.

The valve accommodation member 51 has a regulation-valve-accommodation space 55, a stop-valve-accommodation space (accommodation space) 56, a penetration portion 57, a plate-shaped portion 51A, and a first side wall 51B.

The regulation-valve-accommodation space 55 is formed to be a cylindrical space formed in a central portion of the valve accommodation member 51. The regulation-valve-accommodation space 55 extends in the direction of the axis O. The regulation-valve-accommodation space 55 is partitioned by the inner circumferential surface 51a of the valve accommodation member 51 in the radial direction.

The stop-valve-accommodation space 56 is a ring-shaped space formed outward with respect to the regulation-valve-accommodation space 55. The stop-valve-accommodation space 56 is disposed at the upper side of the steam flow passage 52.

The stop-valve-accommodation space 56 has a first accommodation space 58 and a second accommodation space 59. The first accommodation space 58 and the second accommodation space 59 are disposed in the direction of the axis O.

The first accommodation space 58 is partitioned by an upper portion of the inner circumferential surface 58a, a first opposition surface 58b, and an outer circumferential surface 58c formed in the valve main body 41. The first accommodation space 58 is formed to accommodate a base end portion 75 of the stop valve 45 in a movable state in the direction of the axis O.

The inner circumferential surface 58a is disposed outward with respect to the regulation-valve-accommodation space 55. The inner circumferential surface 58a is a surface extent in the direction of the axis O while being orthogonal with respect to the radial direction of the axis O.

The first opposition surface 58b is a surface facing the base end surface 75a of the stop valve 45. The first opposition surface 58b is a ring-shaped surface orthogonal to the axis O. The first opposition surface 58b is connected with the inner circumferential surface 58a and the plurality of contact surfaces 58d.

The outer circumferential surface 58c is disposed at the outside of the inner circumferential surface 58a so as to surround the upper portion of the inner circumferential surface 58a. An interval between the outer circumferential surface 58c and the inner circumferential surface 58a along the circumferential direction of the outer circumferential surface 58c is constant.

The interval between the outer circumferential surface 58c and the inner circumferential surface 58a is determined such that the base end portion 75 of the stop valve 45 can be moved in the direction of the axis O. The outer circumferential surface 58c and the inner circumferential surface 58a are formed as guide surfaces at the time of guiding the base end portion 75 in the direction of the axis O.

A low-pressure space 58A is formed between the valve main body 41 and the base end portion 75 of the stop valve 45 which partition the first accommodation space 58. The low-pressure space 58A is a part of the first accommodation space 58 with a low pressure.

A volume of the low-pressure space 58A reaches a maximum value when the stop valve 45 makes the steam flow passage 52 to be fully closed, and the volume of the low-pressure space 58A gradually decreases according to the increased opening degree of the stop valve 45. Accordingly, the volume of the low-pressure space 58A reaches a minimum value in the state in which the stop valve 45 make the steam flow passage 52 to be fully opened (a state in which the movement of the stop valve 45 toward the upper side in the direction of the axis O is finished).

In this state, the low-pressure space 58A disposed between the first opposition surface 58b and the base end surface 75a of the base end portion 75 in the direction of the axis O is defined as a first gap 58B.

Accordingly, in the state in which the movement of the stop valve 45 toward the upper side in the direction of the axis O is finished, since the first gap 58B is formed between the base end portion 75 accommodated in the first accommodation space 58 and the valve main body 41, it is possible to prevent the base end portion 75 and a protrusion portion 73 from colliding with the valve main body 41 in the direction of the axis O.

Accordingly, it is possible to limit the abrasion of the base end portion 75 and the protrusion portion 73 due to the collision of the valve main body 41 with respect to the base end portion 75 and the protrusion portion 73 in the direction of the axis O.

The second accommodation space 59 is disposed between the first accommodation space 58 and the steam flow passage 52 in the direction of the axis O.

The second accommodation space 59 is partitioned by a lower part of the inner circumferential surface 58a, a second opposition surface 59a, a bottom surface 59b, and an outer circumferential surface 59c formed in the valve main body 41. The second accommodation space 59 is formed to accommodate the protrusion portion 73 of the stop valve 45 such that the protrusion portion 73 is movable in the direction of the axis O.

The first accommodation space 58 and the second accommodation space 59 are dividedly formed to accommodate the base end portion 75 and the protrusion portion 73 of the stop valve 45 respectively.

The second opposition surface 59a is a surface formed to face a surface 73a of the protrusion portion 73 of the stop valve 45. The second opposition surface 59 is formed in a ring shape, and orthogonal to the axis O.

The second opposition surface 59a is connected with the outer circumferential surface 58c, 59c.

The bottom surface 59b is a surface formed to face a surface 73b of the protrusion portion 73. The bottom surface 59b is formed in a ring shape, and orthogonal to the axis O. The bottom surface 59b is connected with the outer circumferential surface 59c.

The outer circumferential surface 59c is disposed at the outside of the inner circumferential surface 58a so as to surround the lower portion of the inner circumferential surface 58a. The outer circumferential surface 59c is formed more outwardly with respect to the outer circumferential surface 58c. Accordingly, the second accommodation space is formed to be wider than the first accommodation space 58 in the radial direction of the valve main body 41.

A first pressure space 59A and a second pressure space 59B are formed between the valve main body 41 and the stop valve 45 which partition the second accommodation space 59. The first pressure space 59A and the second pressure space 59B are divided by the protrusion portion 73 in the up-down direction.

The first pressure space 59A is disposed at the upper side of the protrusion portion 73. The second pressure space 59B is disposed at the lower side of the protrusion portion 73.

The first pressure space 59A is a space disposed at the side of the base end portion 75 of the stop valve 45. The first pressure space 59A is formed to communicate with the steam flow passage 52 via the flow passage 45B formed in the stop valve 45. The flow passage 45B is an example of a first feed/discharge portion configured to adjust the pressure in the first pressure space 59A.

The first pressure space 59A is formed to have a pressure higher than that in the second pressure space 58A. The first pressure space 59A is formed to be a space as a part of the second accommodation space 59 with a high pressure.

A volume of the first pressure space 59A reaches a maximum value when the stop valve 45 makes the steam flow passage 52 to be fully closed, and the volume of the first pressure space 59A gradually decreases according to the increased opening degree of the stop valve 45.

The volume of the first pressure space 59A reaches a minimum value in the state in which the stop valve 45 make the steam flow passage 52 to be fully opened (a state in which the movement of the stop valve 45 toward the upper side in the direction of the axis O is finished, see FIG. 2).

In this state, the first pressure space 59A disposed between the surface 73a (formed on the side of the based end portion 75) of the protrusion portion 73 and the second opposition surface 59a of the based end portion 75 in the direction of axis O is defined as a second gap 59C.

In this manner, in the state in which the stop valve 45 make the steam flow passage 52 into the full open state so as to form the second gap 59C between the stop valve 45 accommodated in the second accommodation space 59 and the valve main body 41, it is possible to prevent the protrusion portion 73 from colliding with the valve main body 41 at the upper side in the direction of the axis O.

Accordingly, it is possible to limit the abrasion of the stop valve 45 due to the collision of the valve main body 41 and the stop valve 45 at the upper side in the direction of the axis O.

The second pressure space 59B is a space disposed at the side of the base end portion 75 of the stop valve 45. The second pressure space 59B is connected to a pressure regulation mechanism (not shown) so as to change the pressure of the second pressure space 59B to the low pressure or the high pressure.

When the pressure in the second pressure space 59B is adjusted to the low pressure, the stop valve 45 is pressed toward the lower side in the direction of the axis O due to the pressure in the first pressure space 59A such that the stop valve 45 moves downwardly toward the valve seat 48.

On the other hand, when the pressure in the second pressure space 59B is adjusted to the high pressure, the stop valve 45 is pressed toward the upper side in the direction of the axis O due to the pressure in the second pressure space 59B such that the stop valve 45 moves upwardly so as to be apart from the valve seat 48.

The second pressure space 59B is the space configured to adjust the open/close state and the opening degree of the stop valve 45.

The above-described second pressure space 59B is a space formed to adjust the open/close state and the opening degree of the stop valve 45.

The plate-shaped portion 51A is formed to be orthogonal to the direction of the axis O while having a bottom surface 59b exposed to the second pressure space 59B.

The first side wall 51B is orthogonal with respect to the plate-shaped portion 51A. The first side wall 51B has an outer circumferential surface 59c partitioning the outer circumference of the second pressure space 59B. That is, the outer circumferential surface 59c surrounds the outer circumference of the second pressure space 59B. A plurality of feed/discharge holes 60A-60C are formed on the first side wall 51B. The plurality of feed/discharge holes 60A-60C is an example of a second feed/discharge portion configured to adjust the pressure in the second pressure space 59B.

The plurality of feed/discharge holes 60A are formed to penetrate a part of the first side wall 51B at the steam flow passage 52 side in the radial direction of the axis O.

The plurality of feed/discharge holes 60B are formed in a part of the first side wall 51B at the first accommodation space 58 side compared with the position where the plurality of feed/discharge holes 60A are formed. The plurality of feed/discharge holes 60B are formed to penetrate the first side wall 51B in the radial direction of the axis O. The plurality of feed/discharge holes 60B are formed to have the same shapes and the same inner diameters with that of the plurality of feed/discharge holes 60A.

The plurality of feed/discharge holes 60C are formed in a part of the first side wall 51B at the first accommodation space 58 side compared with the position where the plurality of feed/discharge holes 60B are formed. The plurality of feed/discharge holes 60C are formed to penetrate the first side wall 51B in the radial direction of the axis O. The plurality of feed/discharge holes 60C are formed to have the same shapes and the same inner diameters with that of the plurality of feed/discharge holes 60A.

The plurality of feed/discharge holes 60A-60B are formed in the direction of the axis O. The plurality of feed/discharge holes 60A-60B are holes configured to supply the high-pressure steam into the second pressure space 59B so as to make the pressure in the second pressure space 59B to be in the high-pressure state, or discharge the high pressure steam from the second pressure space 59B so as to make the pressure in the second pressure space 59B to be in the low-pressure state.

In the state in which the stop valve 45 makes the steam flow passage 52 into the full open state ("the state in which the pressure in the second pressure space 59B is high" shown in FIG. 2), the plurality of feed/discharge holes 60A-60C communicate with the second pressure space 59B.

When the stop valve 45 is moved to approach the valve seat 48 (that is, the high-pressure steam in the second pressure space 59B is discharged from the plurality of feed/discharge holes 60A-60C) from the state shown in FIG. 2, a height of the second pressure space 59B in the direction of the axis O becomes smaller, the inner side of the plurality of feed/discharge holes 60C are blocked by the protrusion portion 73 such that only the plurality of feed/discharge holes 60A-60B communicate with the second pressure space 59B.

Figure 4:
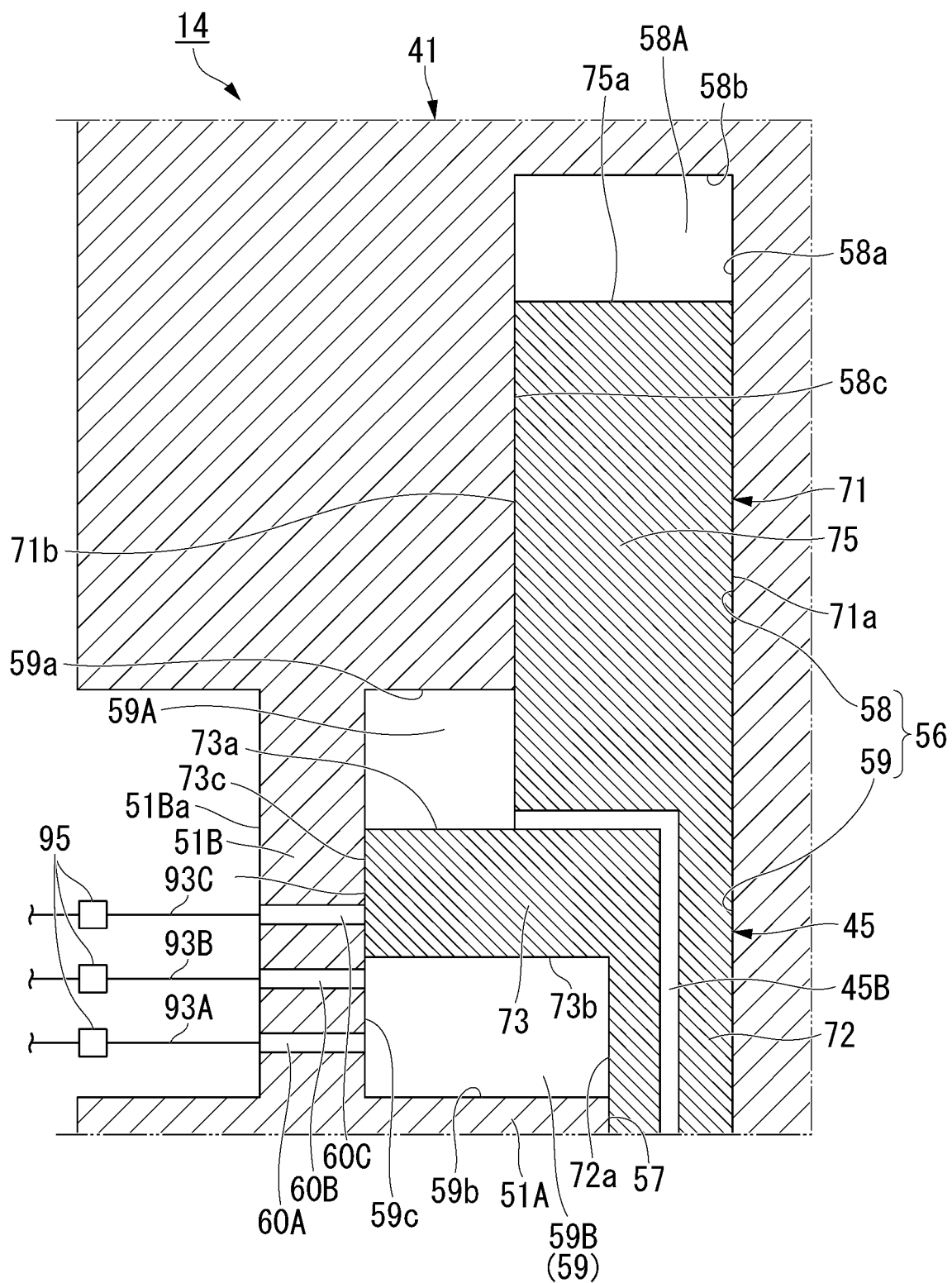
FIG. 4 is a sectional view schematically showing a state in which the stop valve shown in FIG. 3 is moving to a valve seat side.

Thereafter, when the stop valve 45 is further moved to approach the valve seat 48 to fully close the steam flow passage 52 (that is, the high-pressure steam in the second pressure space 59B is discharged from the plurality of feed/discharge holes 60B, 60C) from the state shown in FIG. 4, the height of the second pressure space 59B in the direction of the axis O becomes further smaller, the inner side of the plurality of feed/discharge holes 60B are blocked by the protrusion portion 73 such that only the plurality of feed/discharge holes 60A communicate with the second pressure space 59B.

In this manner, according to the movement of the stop valve 45 toward the valve seat 48 in the direction of the axis O, the feed/discharge holes communicating with the second pressure space 59B among the plurality of feed/discharge holes 60A-60C becomes fewer such that it is possible to gradually decrease a speed by which the pressure in the second pressure space 59B decreases (in other words, the moving velocity of the stop valve toward the valve seat 48).

Accordingly, at the time of rapid closure, it is possible for making the tip end 81A of the stop valve 45 to engage with the valve seat 48 so as to limit the damage of the stop valve 45 and the valve seat 48.

The penetration portion 57 is formed to penetrate the plate-shaped portion 51A having the bottom surface 59b in the valve accommodation member 51. The penetration portion 57 is formed to extend in the direction of the axis O along the inner circumferential surface 58a. The penetration portion 57 is formed in a ring shape in a planar view.

The penetration portion 57 is inserted by a second member 72 of the stop valve 45. A tip end 66A of the stop valve 45 configuring the second member 72 is disposed in the steam flow passage 52. The second member 72 is configured so as to move the penetration portion 57 in the direction of the axis O.

The steam flow passage 52 is formed between the valve seat 48 and the valve accommodation member 51. The inner surface 48a of the valve seat 48 is exposed in the steam flow passage 52.

The steam flow passage 52 has an inlet port 52A and an outlet port 52B. The inlet port 52A of the steam flow passage 52 is connected to the boiler 11 via one side of the first steam supply piping 12. The inlet port 52A of the steam flow passage 52 is formed to introduce the high-pressure steam generated in the boiler 11.

The outlet port 52B of the steam flow passage 52 is connected to the high-pressure steam turbine 31 via the other side of the first steam supply piping 12.

In the state in which the stop valve 45 is open, the high-pressure steam turbine 31 is supplied with the high-pressure steam whose flow rate is adjusted by the regulation valve 43.

The regulation valve 43 is disposed at a downstream side with the position of the stop valve 45 along the direction of the steam flow.

The regulation valve 43 has a shaft portion 63 and a regulation valve main body 64.

The shaft portion 63 extends along the direction of the axis O. Part of the shaft portion 63 at a side of an end 63A thereof is disposed in the regulation-valve-accommodation space 55. The axis of the shaft portion 63 coincides with the axis O.

The shaft portion 63 is configured to be movable in the direction of the axis O.

The regulation valve main body 64 is disposed at the end 63A of the shaft portion 63. The regulation valve main body 64 is formed to be tubular and the regulation valve main body 64 has an open end at the side of the outlet port 52B of the steam flow passage 52. The regulation valve main body 64 has a tip end portion 66 opposite to the steam flow passage 52.

The tip end portion 66 is formed in a ring shape. The tip end portion 66 has an inclination surface 66a inclined along a direction from the inner circumferential surface 64a toward the outer circumferential surface 64b of the regulation valve main body 64. The tip end portion 66 has a tip end 66A opposite to the inner surface 48a of the valve seat 48 in the direction of the axis O.

When the regulation valve 43 is moved in the direction in which the tip end 66A approaches the valve seat 48 as shown in FIG. 2, the flow rate of the high-pressure steam supplied to the high-pressure steam turbine 31 is reduced.

When the tip end 66A comes in contact with the inner surface 48a of the valve seat 48, even if the stop valve 45 is in the open state, the supply of the high-pressure steam to the high-pressure steam turbine 31 is stopped.

The regulation valve 43 has the configuration described above is configured to control the flow rate of the high-pressure steam supplied to the high-pressure steam turbine 31 according to the load of the steam turbine 10.

The stop valve 45 is disposed at the outer side of the regulation valve 43. The stop valve 45 moves upwardly when the stop valve 45 is opened, and the stop valve 45 move downwardly when the stop valve 45 is closed. The stop valve 45 is formed in a tubular shape to surround the regulation valve 43, and a columnar hollow portion 45A in the stop valve 45 is formed to extend in the direction of the axis O. A flow passage 45B is formed in the stop valve 45 so as to communicate the first pressure space 59A with the steam flow passage 52.

The stop valve 45 has a first member 71, the second member 72, and the protrusion portion 73.

The first member 71 has an inner surface 71a, an outer surface 71b, and the base end portion 75.

When the stop valve 45 moves in the direction of the axis O, the inner surface 71a moves along the inner circumferential surface 58a formed in the valve main body 41 in the direction of the axis O.

When the stop valve 45 moves in the direction of the axis O, the outer surface 71b moves along the outer circumferential surface 58c formed in the valve main body 41 in the direction of the axis O.

When the stop valve 45 moves in the direction of the axis O, the state in which the upper portion of the outer circumferential surface 71b is in contact with the outer circumferential surface 58c formed on the valve main body 41 is maintained.

Accordingly, the separated state of the low-pressure space 58A and the first pressure space 59A which have different pressures is constantly maintained.

The base end portion 75 is the portion accommodated in the first accommodation space 58 when the movement of the stop valve 45 toward the upper side in the direction of the axis O is finished.

The base end portion 75 has the inner circumferential surface 71a, the outer circumferential surface 71b, and the base end surface 75a.

The base end surface 75a is a surface opposite to the first opposition surface 58a formed in the valve main body 41.

The second member 72 is connected with the first member 71 via the protrusion portion 73. The second member 72 is formed in a tubular shape and extends in the direction of the axis O from the protrusion portion 73 toward the valve seat 48. The second member 72 is inserted into the penetration portion 57.

The second member 72 has a distal end portion 81 disposed in the steam flow passage 52. The distal end portion 81 has an inclination surface 81a at the opposite side of the above-described inclination surface 66a and a distal end 81A in contact with the inner circumferential surface 48a of the valve seat 48.

A thickness of the second member 72 excluding the distal end portion 81 in the radial direction is thinner than a thickness of the first member 71 excluding the base end portion 75 in the radial direction.

The protrusion portion 73 is disposed between the first member 71 and the second member 72, and the protrusion portion 73 is formed in a ring shape. The protrusion portion 73 is formed to connect the first member 71 and the second member 72 disposed in the direction of the axis O. The protrusion portion 73 is accommodated in the second accommodation space 59.

The protrusion portion 73 is configured to protrude outwardly in the radial direction with respect to the outer circumferential surface 71b of the first member 71 and the outer circumferential surface 72a of the second member 72.

The protrusion portion 73 includes surfaces 73a, 73b, and the outer circumferential surface 73c.

The surface 73a is a ring-shaped surface orthogonal to the axis O. The surface 73a is formed to face the second opposition surface 59a in the direction of the axis O. The surface 73a together with the second opposition surface 59a partition the first pressure space 59A.

The surface 73b is a ring-shaped surface orthogonal to the axis O, and the surface 73b is disposed at the opposite side with respect to the surface 73a. The surface 73b is formed to face the bottom surface 59b in the direction of the axis O. The surface 73b together with the bottom surface 59b partition the second pressure space 59B. The outer circumferential surface 73c is in contact with the outer circumferential surface 59c formed in the valve main body 41.

When the stop valve 45 moves in the direction of the axis O, the protrusion portion 73 moves in the direction of the axis O in the second accommodation space 59.

The switching mechanism 15 is disposed at the outside of the steam valve main body 14. The switching mechanism 15 has a high-pressure source 85, a low-pressure source 86, a first piping 88, a second piping 89, a three-way valve 91, a third piping 93, and a throttle 95.

The high-pressure source 85 has a function of generating a fluid having a high pressure. According to the first embodiment, as an example, a case of using the boiler 11 generating the high-pressure steam as the high-pressure source 85 will be described below.

The low-pressure source 86 is configured to make the second pressure space 59B by discharging the high-pressure steam in the second pressure space 59B to the outside of the second pressure space 59B. For example, by atmosphere releasing the high-pressure steam in the second pressure space 59B, the pressure in the second pressure space 59B is decreased.

The first piping 88 has one end connected to the boiler 11 and the other end connected to the three-way valve 91. The first piping 88 is configured to supply the high-pressure steam generated in the boiler 11 to the three-way valve 91.

The second piping 89 has one end connected to the low-pressure source 86 and the other end connected to the three-way valve 91. The second piping 89 is configured to introduce the high-pressure steam in the second pressure space 59B which is discharged via the three-way valve 91 to the low-pressure source 86.

The three-way valve 91 is connected to the other end of the third piping 93. The three-way valve 91 is connected to the second pressure space 59B via the third piping 93.

In a case of supplying the high-pressure steam generated in the boiler 11 to the second pressure space 59B (the case of opening the steam flow passage 52 which is closed by the stop valve), the three-way valve 91 supplies the high-pressure steam supplied from the first piping 88 to the third piping 93.

On the other hand, in a case of making the pressure in the second pressure space 59B to be low (the case of closing the steam flow passage 52 which is opened by the stop valve), the three-way valve 91 introduces the high-pressure steam in the second pressure space 59B discharged by the third piping 93 to the second piping 89.

The third piping 93 is branched at one end so as to have a plurality of branch pipings 93A-93C.

A number of the branch pipings 93A is same with a number of the feed/discharge holes 60A. The branch piping 93A is connected to one feed/discharge hole 60A from the outside of the valve main body 41. The branch piping 93A is used to supply the high-pressure steam to the second pressure space 59B or discharge the high-pressure steam from the second pressure space 59B via the feed/discharge hole 60A.

A number of the branch pipings 93B is same with a number of the feed/discharge holes 60B. The branch piping 93B is connected to one feed/discharge hole 60B from the outside of the valve main body 41. The branch piping 93B is used to supply the high-pressure steam to the second pressure space 59B or discharge the high-pressure steam from the second pressure space 59B via the feed/discharge hole 60B.

A number of the branch pipings 93C is the same as a number of the feed/discharge holes 60C. The branch piping 93C is connected to one feed/discharge hole 60C from the outside of the valve main body 41. The branch piping 93C is used to supply the high-pressure steam to the second pressure space 59B or discharge the high-pressure steam from the second pressure space 59B via the feed/discharge hole 60C.

The throttle 95 is disposed corresponding to each of the plurality of branch pipings 93A-93C.

In this manner, by disposing the throttle 95 corresponding to each of the plurality of branch pipings 93A-93C, it is possible to discharge the high-pressure steam slowly at the time of discharging the high-pressure steam from the second pressure space 59B via the plurality of feed/discharge holes 60A-60C. Accordingly, at the time of rapid closure, it is possible to make the distal end 81A of the stop valve 45 to more slowly engages with the valve seat 48 so as to further limit the damage of the stop valve 45 and the valve seat 48.

The second steam supply piping 16 has one end connected to the outlet port of the high-pressure steam turbine 31, and the other end thereof is connected to the inlet port of the middle-pressure steam turbine 32. The steam used in the high-pressure steam turbine 31 is discharged in the second steam supply piping 16.

The second steam supply piping 16 is a piping for supplying the steam used in the high-pressure steam turbine 31 to the middle-pressure steam turbine 32.

The reheater 18 is disposed in the second steam supply piping 16. The reheater 18 is configured to generate the steam with middle pressure (hereinafter described as "middle-pressure steam") by heating the steam discharged from the high-pressure steam turbine 31. The generated middle-pressure steam is supplied to the downstream side of the reheater 18.

The stop valve 21 is disposed in the part of the second steam supply piping 16 at the downstream side of the reheater 18. The stop valve 21 has the same function with that of the stop valve 45 described above.

The regulation valve 22 is disposed in the part of the second steam supply piping 16 at the downstream side of the stop valve 21. The regulation valve 22 has the same function as that of the regulation valve 43 described above.

The third steam supply piping 25 has one end connected to the outlet port of the middle-pressure steam turbine 32, and the other end thereof is connected to the inlet port of the low-pressure steam turbine 33. The steam used in the middle-pressure steam turbine 32 so as to have the low pressure (hereinafter described as "low-pressure steam") is discharged to the third steam supply piping 25.

The low-pressure steam discharged to the third steam supply piping 25 is supplied to the low-pressure steam turbine 33.

The generator 26 is connected to one end of the rotation shaft 35. The generator 26 is driven by a rotation driving force of the steam turbine 10 via the rotation shaft 35.

According to the steam valve 13 according to the first embodiment, the second pressure space 59B communicates with the outside of the steam valve main body 14 while providing a plurality of feed/discharge holes 60A-60C formed in the direction of the axis O, when the stop valve 45 moves in the direction toward the valve seat 48, the sum of the aperture areas of the feed/discharge holes 60A-60C exposed to the second pressure space 59B decreases such that when the tip end 81A of the stop valve 45 approaches the valve seat 48, it may be difficult for the high-pressure steam in the second pressure space 59B to be discharged.

In other words, when the tip end 81A of the stop valve 45 approaches the valve seat 48, it is possible to decrease the moving velocity of the tip end 81A of the stop valve 45. Accordingly, at the time of rapid closure, it is possible to make the tip end 81A of the stop valve 45 to slowly engage with the valve seat 48 so as to limit the damage of the stop valve 45 and the valve seat 48.

According to the power generation system 1 having the above-described steam valve 13, the damage of the stop valve 45 and the valve seat 48 is limited so as to make the power generation system 1 to stably operate.

Also, the steam supplied to the second pressure space 59B may have a pressure equal to or higher than the pressure in the first pressure space 59A.

Figure 7:
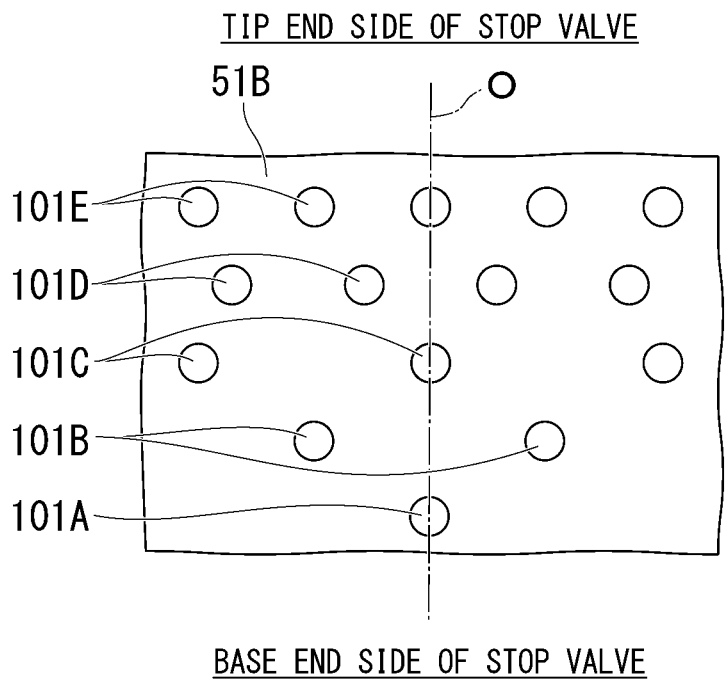
FIG. 7 is a view of another example (second) of the plurality of feed/discharge holes.
Figure 8:
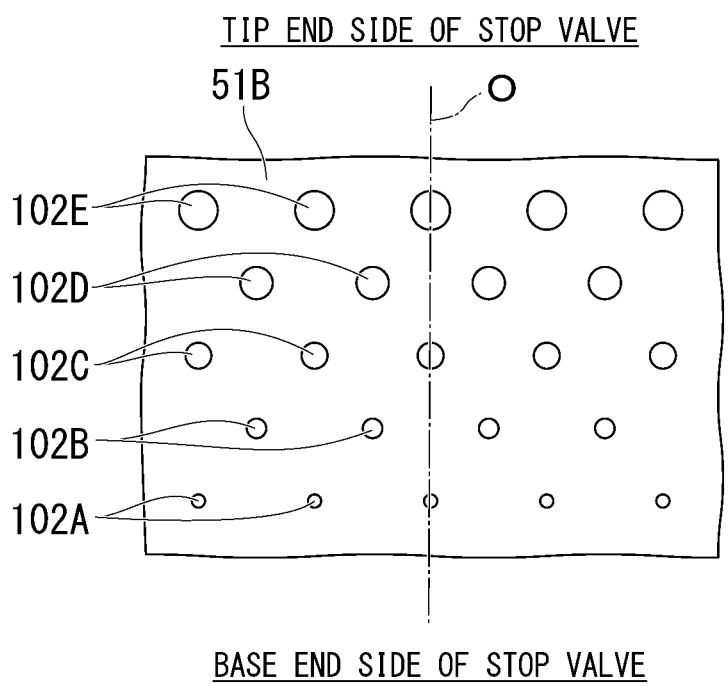
FIG. 8 is a view of another example (third) of the plurality of feed/discharge holes.

Hereinafter, other examples of the plurality of feed/discharge holes will be described with reference to FIGS. 6-8. In FIGS. 6-8, the same configurations with the structure body shown in FIG. 5 will be assigned with same reference signs. Also, in FIG. 7, the same configurations with the structure body shown in FIG. 6 will be assigned with the same reference signs.

In FIG. 6, in the first side wall 51B, feed/discharge holes 101A-101E are formed in the direction of the axis O, and feed/discharge-hole groups 101F are formed in the circumferential direction of the first side wall 51B by intervals.

The feed/discharge holes 101A are formed at the distal end portion 81 side of the stop valve 45 as shown in FIG. 2. The feed/discharge holes 101A-101D are formed in a sequence of feed/discharge hole 101A, feed/discharge holes 101B, feed/discharge holes 101C, and feed/discharge holes 101D in a direction from the tip end portion 81 toward the base end portion 75 (see FIG. 2).

Figure 5:
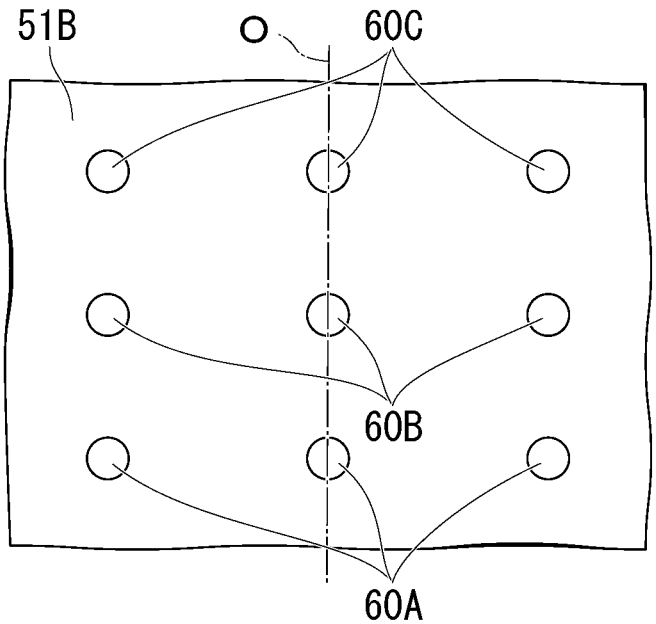
FIG. 5 is a view showing a region of a first side wall on which a plurality of feed/discharge holes are formed which are viewed from the outside thereof.
Figure 6:
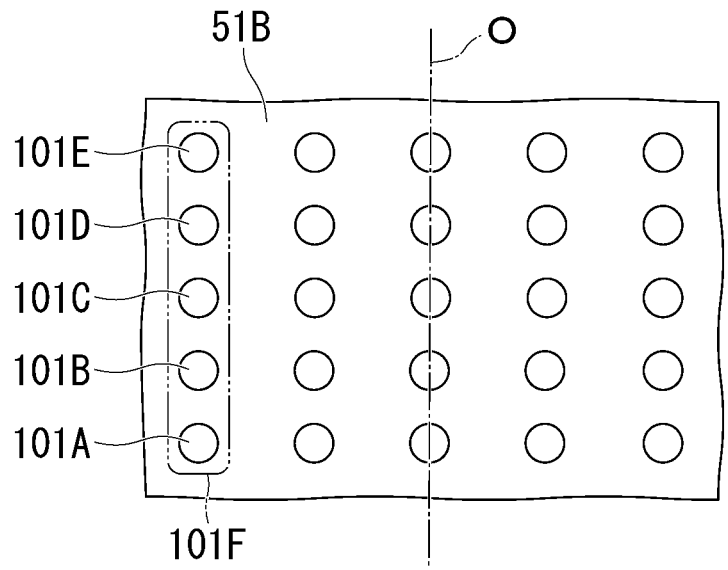
FIG. 6 is a view of another example (first) of the plurality of feed/discharge holes.

In the above-described FIG. 5, the case in which three feed/discharge holes (feed/discharge holes 60A-60C) are formed in the direction of the axis O, and three feed/discharge holes are formed in the circumferential direction of the first side wall 51B by intervals is described as an example, however, as shown in FIG. 6, by forming more feed/discharge holes 101A-101E, it is possible to make the distal end 81A of the stop valve 45 to engage with the valve seat 48 further more slowly at the time of rapid closure.

The plurality of feed/discharge holes 101A-101E shown in FIG. 7 have same configurations with the feed/discharge holes 101A-101E shown in FIG. 6 except that a number of the feed/discharge holes decreases in the direction from the feed/discharge hole 101E toward the feed/discharge hole 101A.

In this manner, since the number of the feed/discharge holes decreases in the direction from the feed/discharge hole 101E toward the feed/discharge hole 101A, when the tip end 81A of the stop valve 45 approaches the inner circumferential surface 48a of the valve seat 48 (see FIG. 2), it is possible for the high-pressure steam in the second pressure space 59B to be more difficult discharged to the outside of the first side wall 51B.

Accordingly, when the tip end 81A of the stop valve 45 approaches the inner circumferential surface 48a of the valve seat 48 (see FIG. 2), it is possible to make the moving velocity of the stop valve 45 in the direction of the axis O to be further slower such that the damage of the stop valve 45 and the valve seat 48 can be further limited.

In FIG. 8, the feed/discharge holes 102A-102E whose aperture diameters are different are formed on the first side wall 51B. The feed/discharge hole 102A are formed in a position near the plate-shaped portion 51A shown in FIG. 2.

The plurality of feed/discharge holes 102A-102E are formed in a sequence of the feed/discharge holes 102A, the feed/discharge holes 102B, the feed/discharge holes 102C, the feed/discharge holes 102D, and the feed/discharge holes 102E along the direction from the tip end portion 81 toward the base end portion 75 of the stop valve 45. The plurality of feed/discharge holes 102A-102E are formed in the direction of the axis O.

Among the plurality of feed/discharge holes 102A-102E, the aperture diameter of the feed/discharge hole 102A is the smallest, and the aperture diameters thereof become larger in the sequence of the feed/discharge hole 102B, the feed/discharge hole 102C, the feed/discharge hole 102D, and the feed/discharge hole 102E.

The plurality of feed/discharge holes 102A-102E are disposed in positions where distances between each of the plurality of feed/discharge holes 102A-102E and the plate-shaped portion 51A become larger in the sequence of the feed/discharge holes 102A, the feed/discharge holes 102B, the feed/discharge holes 102C, the feed/discharge holes 102D, and the feed/discharge holes 102E.

The plurality of feed/discharge holes 102A-102E having the above-described configurations have the same effects with that of the plurality of feed/discharge holes 101A-101E shown in FIG. 7.

According to the first embodiment, as an example, the configuration of using the flow passage 45B as the first feed/discharge portion and using the plurality of the feed/discharge holes 60A-60C as the second feed/discharge portion is described; however, the first feed/discharge portion and the second feed/discharge portion are not limited thereto.

As an example, the steam valve 13 according to the first embodiment is described to have the first feed/discharge portion configured to adjust the pressure in the first pressure space 59A and the second feed/discharge portion configured to adjust the pressure in the second pressure space 59B; however, a steam valve only has to be able to move the protrusion portion 73 in the up-down direction by adjusting the pressure in the first pressure space 59A and the second pressure space 59B.

Second Embodiment

Figure 9:
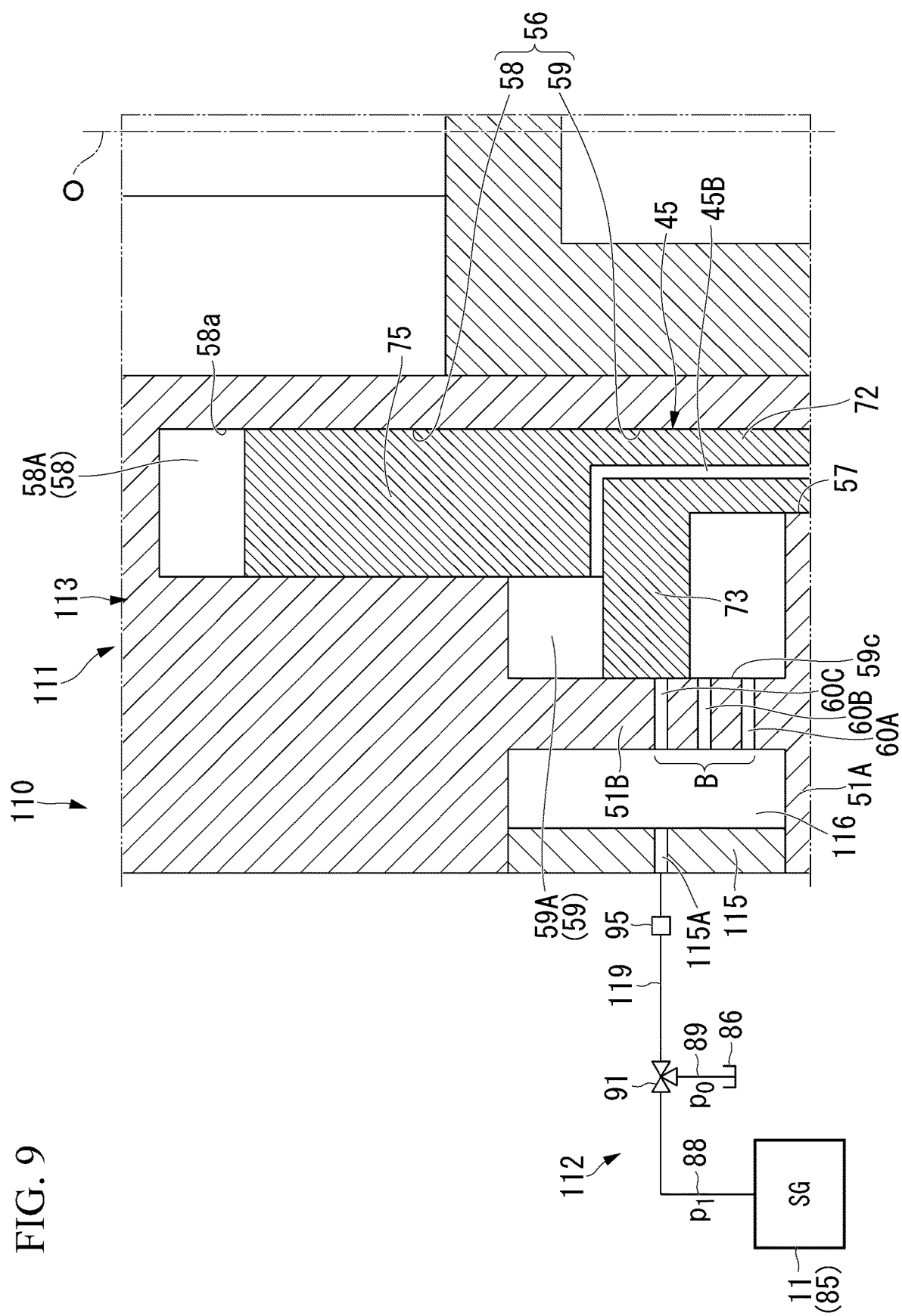
FIG. 9 is a view showing main parts of a steam valve and showing a section of a main body of a steam valve according to a second embodiment of the present invention.

A steam valve 110 according to a second embodiment of the present invention will be described with reference to FIG. 9. In FIG. 9, the same configurations with those of the structure body shown in FIGS. 2-4 will be assigned to the same reference signs. In FIG. 9, the reference sign "B" shows a feed/discharge-hole-formation area (hereinafter described as "feed/discharge-hole-formation area B") in the first side wall 51B where the plurality of feed/discharge holes 60A-60C are formed.

The steam valve 110 has a steam valve main body 111 and a switching mechanism 112.

The steam valve main body 111 has the same configuration with that of the steam valve main body 14 according to the first embodiment except for having a valve main body 113 instead of the valve main body 41 configuring the steam valve main body 14.

The valve main body 113 has the same configuration with that of the valve man body 41 according to the first embodiment except for further having a second side wall 115 in which a penetration hole 115A is formed and a space 116.

The second side wall 115 is disposed at the outside of the feed/discharge-hole-formation area B.

The penetration hole 115A is configured to penetrate the second side wall 115 in the radial direction with respect to the axis O. Only one penetration hole 115A is formed. The penetration hole 115A communicates with the space 116. The penetration hole 115A communicates with the second space 59B via the space 116.

The space 116 is partitioned between the feed/discharge-hole-formation area B and the second side wall 115. The space 116 communicates the penetration hole 115A and the feed/discharge holes 60A-60C. The pressure state in the space 116 is same with the pressure state in the second pressure space 59B.

The switching mechanism 112 has the same configuration with that of the switching mechanism 15 according to the first embodiment except for having a third piping 119 instead of the third piping 93 configuring the switching mechanism 15.

The third piping 119 has one end connected with the outside of the penetration hole 115A, and the other end connected with the three-way valve 91. The throttle 95 is disposed in the third piping 119.

In the steam valve 110 having the above-described configuration, the high-pressure steam supplied from the boiler 11 is supplied to the second pressure space 59 via the space 116. When the pressure in the second pressure space 59B is made to be low, the high-pressure steam in the second space 59B is discharged to the outside of the valve main body 113 via the space 116.

According to the second embodiment, since the steam valve 110 has the valve main body 113 and the switching mechanism 112, wherein the valve main body 113 has the second side wall 115 and the space 116 communicating with the penetration 115A and the plurality of feed/discharge holes 60A-60C, the second side wall 115 is disposed at the outside of the feed/discharge-hole-formation area B in which the plurality of feed/discharge holes 60A-60C are formed, the penetration hole 115A is formed in the second side wall 115, and the space 116 is partitioned between the feed/discharge-hole-formation area B and the second side wall 115, it is not necessary to connect the branched piping to each of the plurality of feed/discharge holes 60A-60C such that the configuration of the switching mechanism 112 can be simplified.

The steam valve 110 having the above-described configuration according to the second embodiment has the same effects with the steam valve 13 according to the first embodiment.

Also, the second embodiment is effective with respect to the situation in which more feed/discharge holes 101A-101E are formed and the situation in which the inner diameters of the feed/discharge holes 102A-102E are different with each other.

Third Embodiment

Figure 3:
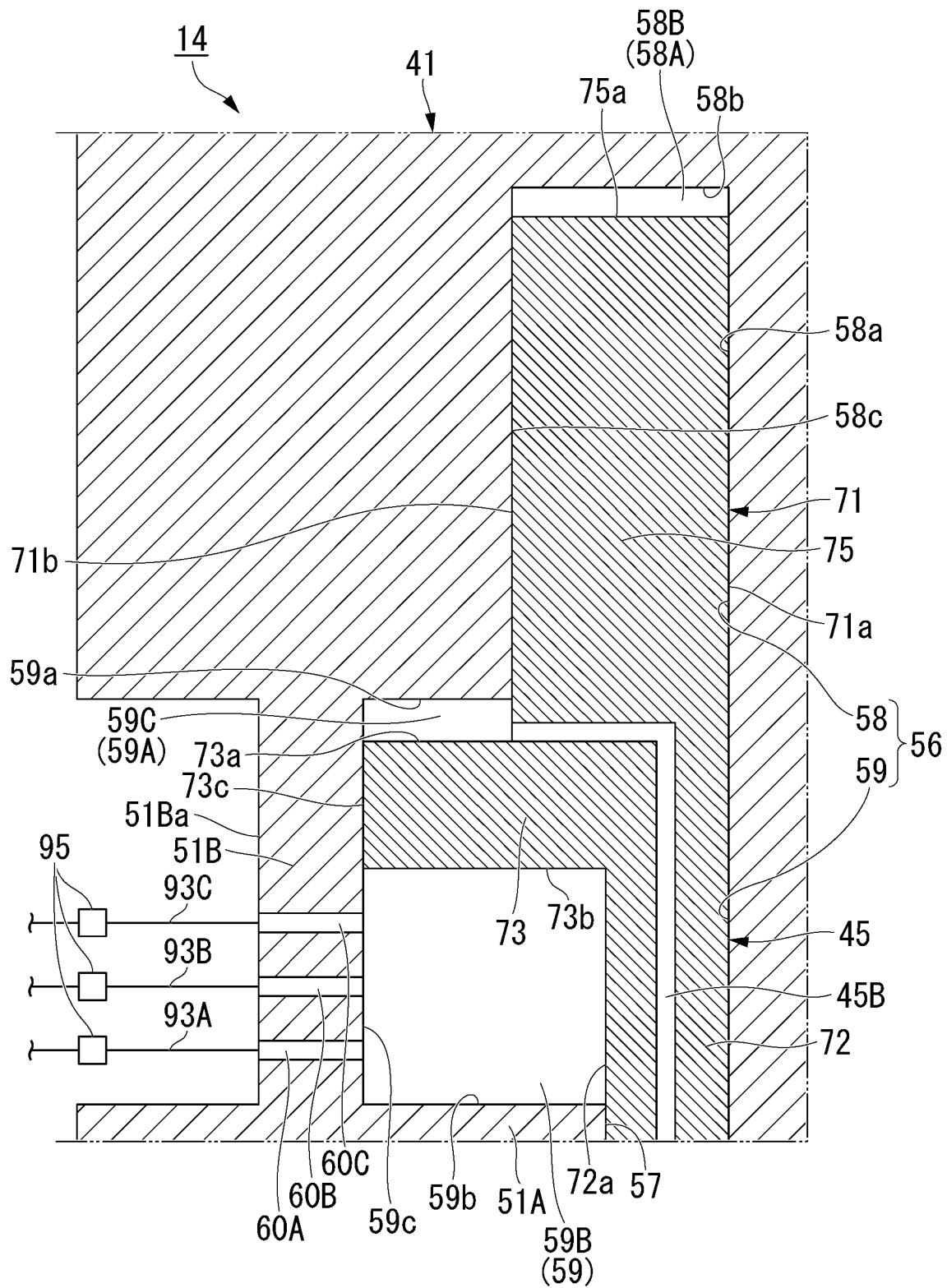
FIG. 3 is an enlarged sectional view showing a part surrounded by a region A in the steam valve showing in FIG. 2.
Figure 10:
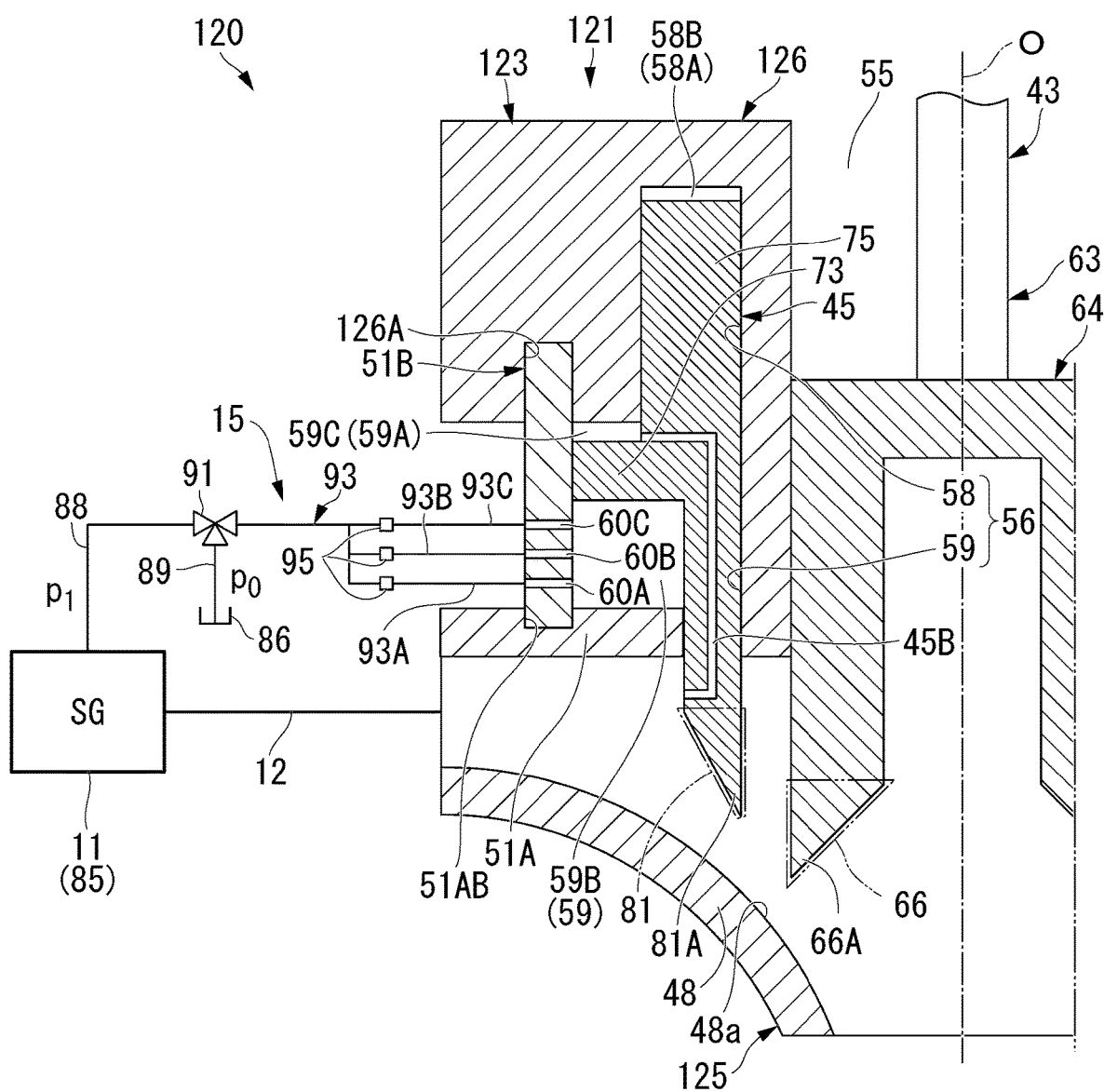
FIG. 10 is a view showing main parts of a steam valve and showing a section of a main body of a steam valve according to a third embodiment of the present invention.

A steam valve according to the third embodiment of the present invention will be described with reference to FIG. 10. In FIG. 10, the same configurations with that of the structure body shown in FIGS. 2-4 are assigned to the same reference signs.

The steam valve 120 has the same configuration with that of the steam valve 13 according to the first embodiment except for having a steam valve main body 121 instead of the steam valve main body 14 of the steam valve 13.

The steam valve main body 121 has the same configuration with the steam valve main body 14 except for having a valve main body 123 instead of the valve main body 41.

The valve main body 123 has a first member 125, a second member 126, and a first side wall 51B, and the valve main body 123 has the same configuration with that of the valve main body 41 except that the above-described three members are configured to be attachable and detachable.

The first member 125 has the valve seat 48 and the plate-shaped portion 51A to partition the steam flow passage 52.

The plate-shaped portion 51A is formed to be opposite to the second member 126 in the direction of the axis O. In the part of the plate-shaped portion 51 opposite to the second member 126, a first groove 51AB is formed.

The first groove 51AB is formed for an end portion of the first side wall 51B positioned at an upper side in the direction of the axis O to be inserted.

The second member 126 is configured to be attachable to and detachable from the first member 125. The second member 126 is formed to partition the regulation-valve-accommodation space 55 and the first accommodation space 58, and the second member 126 has a second groove 126A facing the first groove 51AB.

The second groove 126A is formed for an end portion of the first side wall 51B positioned at a lower side in the direction of the axis O to be inserted.

The end portions of the first side wall 51B in the direction of the axis O are inserted into the first groove 51AB and the second groove 126A such that the position of the first side wall 51B is restricted.

The first side wall 51B can be detached from the first member 125 by detaching the second member 126 from the first member 125.

According to the third embodiment, since the steam valve 120 has the first member 125, the second member 126, and the first side wall 51B in which the plurality of feed/discharge holes 60A-60C are formed, wherein the first member 125, the second member 126, and the first side wall 51B are configured separately, and the first side wall 51B is attachable to and detachable from the first member 125 and the second member 126, it is easy to exchange another first side wall having the plurality of feed/discharge holes with different aperture diameters and configurations.

Accordingly, for example, in a case of performing test of the steam valve 120 by using a fluid such as the air besides the steam, it is easy to exchange a first side wall in which the feed/discharge holes suitable for the air are formed. In other words, it is easy to perform the test of the fluid besides the steam.

In the steam valve 120 according to the third embodiment, the second side wall 115 in which the penetration hole 115A is formed shown in FIG. 9 may be applied. In this case, grooves may be formed in the first member 125 and the second member 126 respectively for the second side wall 115 to be inserted thereto.

Fourth Embodiment

Figure 11:
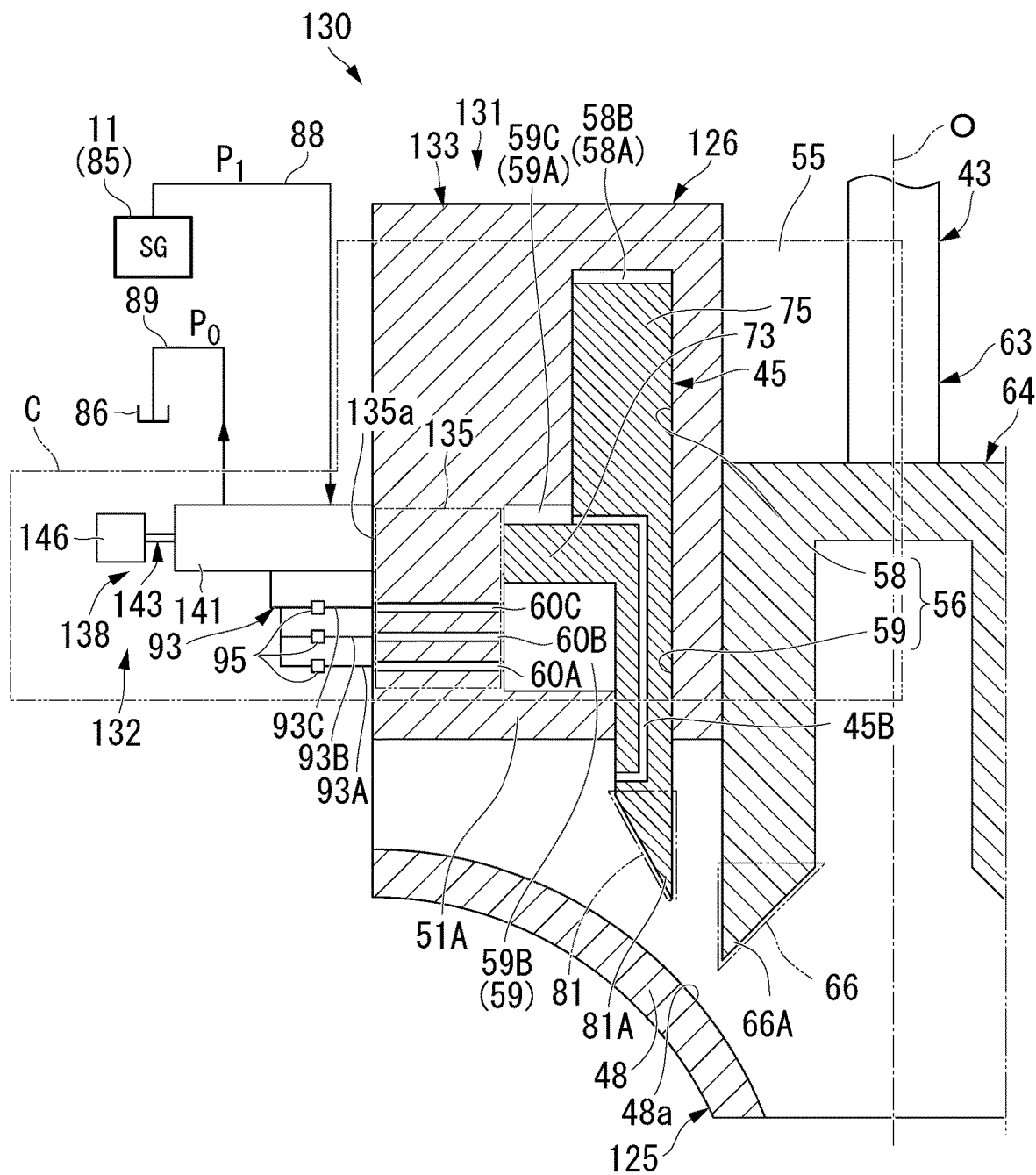
FIG. 11 is a view showing main parts of a steam valve and showing a section of a main body of a steam valve according to a fourth embodiment of the present invention.

A steam valve 130 according to a fourth embodiment of the present invention will be described with reference to FIGS. 11-12. In FIG. 11, the reference sign C indicates a region (hereinafter described as "region C"). In FIG. 11, the configurations same with that in the structure body shown in FIGS. 2-4 are assigned to the same reference signs.

Figure 12:
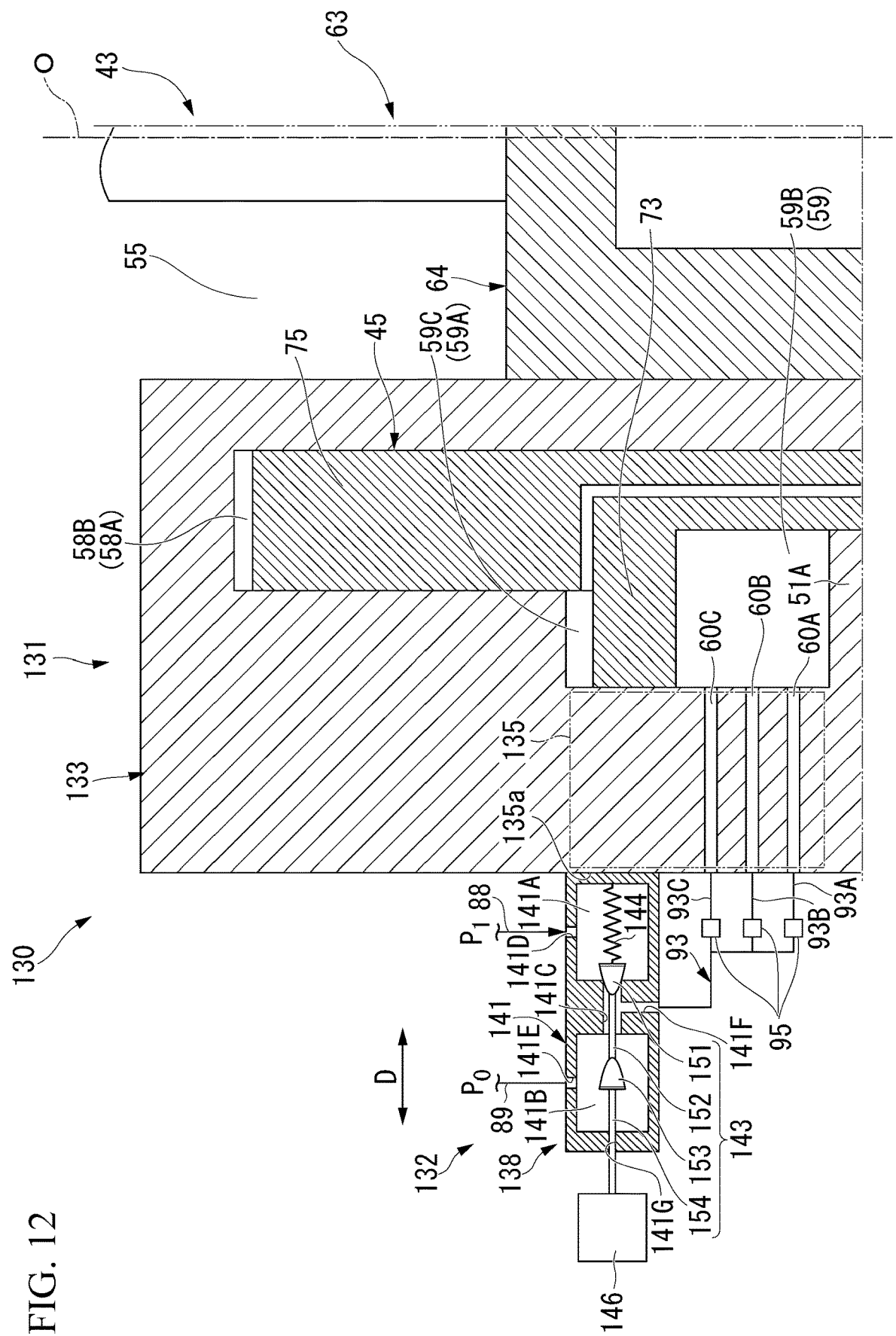
FIG. 12 is an enlarged sectional view showing a part surrounded by a region C in the steam valve showing in FIG. 11.

In FIG. 12, the reference D indicates a separation direction (hereinafter described as "separation direction D") in which the first space 141A and the second space 141B separate from each other. In FIG. 12, the configurations same with that in the structure body shown in FIG. 11 are assigned to the same reference signs.

The steam valve 130 has a steam valve main body 131 and a switching mechanism 132.

The steam valve main body 131 has the same configuration with the steam valve main body 14 according to the first embodiment except for having a valve main body 133 instead of the valve main body 41 configuring the steam valve main body 14.

The valve main body 133 has the same configuration of the valve main body 41 except for having a first side wall 135 instead of the first side wall 51B configuring the valve main body 41.

The first side wall 135 has the same configuration with that of the first side wall 51B except that a thickness of the first side wall 135 is thicker than a thickness of the first side wall 51B in the radial direction with respect to the axis O, and there is not a concave portion formed inwardly in the radial direction with respect to the axis O in an outer circumferential surface 135a.

The switching mechanism 132 has the same configuration with that of the switching mechanism 15 according to the first embodiment except for having a three-way valve 138 instead of the three-way valve 91 configuring the switching mechanism 15.

The three-way valve 138 is disposed at the outside of the valve main body 133, and the three-way valve 138 has a main body portion 141, a moving portion 143, a spring portion 144, and a driving portion 146.

The main body portion 141 has a first space 141A, a second space 141B, a moving-portion-insertion hole 141C, a supply hole 141D, a discharge hole 141E, a hole 141F, and an insertion hole 141G.

The first space 141A communicates with the supply hole 141D connecting with the first piping 88. The first space 141A is a space to which the high-pressure steam is supplied via the supply hole 141D.

The second space 141B is formed to be apart from the first space 141A in the separation direction D. The second space 141B communicates with the discharge hole 141E connecting to the second piping 89. The second space 141B is connected to the low-pressure source 86 via the second piping 89. Accordingly, the pressure in the second space 141B is low.

The moving-portion-insertion hole 141C is formed between the first space 141A and the second space 141B. The moving-portion-insertion hole 141C communicates with the first space 141A and the second space 141B in the separation direction D.

In the moving-portion-insertion hole 141C, a part of the moving portion 143 is accommodated in a state in which the moving portion 143 is movable in the separation direction D.

The supply hole 141D is formed to extend in a direction orthogonal to the separation direction D. The supply hole 141D is configured to communicate the outside of the main body portion 141 with the first space 141A.

The discharge hole 141E is formed to extend in the direction orthogonal to the separation direction D. The discharge hole 141E is configured to communicate the outside of the main body portion 141 with the second space 141B.

The hole 141F is formed to extend in the direction orthogonal to the separation direction D. The hole 141F is formed to communicate the moving-portion-insertion hole 141C with the main body portion 141.

The insertion hole 141G is formed to be opposite to the moving-portion-insertion hole 141C via the second space 141B. The insertion hole 141G is formed to communicate the outside of the main body portion 141 and the second space 141B.

The main body portion 141 having the above-described configuration is fixed to the outer circumferential surface 135a of the first side wall 135 such that the first space 141A is disposed at the side of the valve main body 133, and the separation direction D coincides with the direction of the axis O.

The moving portion 143 has a first plug body 151, connection shafts 152, 154, and a second plug body 153.

The first plug body 151 is disposed in the first space 141A. The first plug body 151 has a shape with an outer diameter decreasing in a direction from the first space 141A toward the second space 141B.

The first plug body 151 is configured to block the supply of the high-pressure steam supplied to the first space 141A to the second pressure space 59B and discharge the high-pressure steam in the second pressure space 59B to the outside by moving in the direction toward the second space 141B such that the first plug body 151 engages with the main body portion 141 in a state in which part of the first plug body 151 is inserted into the moving-portion-insertion hole 141C.

On the other hand, in the state in which the first plug body 151 is separated from the main body portion 141, the high-pressure steam is supplied to the moving-portion-insertion hole 141C.

The connection shaft 152 extends in the separation direction D in the state in which part of the connection shaft 152 is accommodated in the insertion hole 141O. The connection shaft 152 has an end connected to a tip end of the first plug body 151, and the other end connected to a tip end of the second plug body 153.

The second plug body 153 is disposed in the second space 141B. A shape of the second plug body is formed to have an outer diameter decreasing in a direction from the second space 141B toward the first space 141A.

The second plug body 153 is configured to block the supply of the high-pressure steam supplied to the first space 141A to the second pressure space 59B and discharge the high-pressure steam in the second pressure space 59B to the outside by moving in the direction toward the first space 141A such that the second plug body 153 engages with the main body portion 141 in a state in which part of the second plug body 153 is inserted into the moving-portion-insertion hole 141C.

On the other hand, in the state in which the second plug body 153 is separated from the main body portion 141, the high-pressure steam in the second pressure space 59B is discharged to the outside.

The connection shaft 154 extends in the separation direction D and the connection shaft is inserted into the insertion hole 141G in a state of being movable in the separation direction D. The connection shaft 154 has an end connected to a base end of the second plug body 153 and another end connected to the driving portion 146.

The spring portion 144 is disposed in the first space 141A in a state of being able to apply an elastic force in the separation direction D.

The spring portion 144 has an end connected to an inner circumferential wall of the main body portion 141 partitioning the first space 141A and another end connected to the driving portion 146.

The spring portion 144 is configured to always apply the elastic force to (press) the first plug body 151 in the direction from the first space 141A toward the second space 141B.

According to the spring portion 144 having the configuration described above, when the malfunction has occurred in the driving portion 146, the second space connecting to the low-pressure source is connected with the second pressure space 59B. Accordingly, when the malfunction has occurred in the driving portion 146, it is possible to limit the high-pressure steam supplied from the high-pressure source 85 from flowing to the second pressure space 59B so as to secure the safety of the steam valve 130.

The driving portion 146 is configured to move the moving portion 143 in the separation direction D. The driving portion 146 is configured to communicate either of the first space 141A and the second space 141B with the second pressure space 59B via the hole 141F and the third piping 93. It is possible to adopt a solenoid as the driving portion 146.

In the steam valve 130 according to the fourth embodiment, the main body portion 141 configuring the switching mechanism 132 is fixed to the outer circumferential surface 135a of the first side wall 135 (a part of the valve main body 133) such that it is possible to dispose the main body portion 141 near the second pressure space 59B. Accordingly, the second pressure space 59B can be switched from the high-pressure state to the low-pressure state in a short period of time.

Also, by coinciding the separation direction D of the first space 141A and the second space 141B with the radial direction of the axis O, it is possible to limit the negative effects due to the thermal deformation generated in the valve main body 133 in the direction of the axis O to the main body portion 141 and the moving portion 143. Accordingly, it is possible to limit the negative effect due to the thermal deformation of the valve main body 133 to the movement of the moving portion 143.

Accordingly, according to the steam valve 130, it is possible to limit the thermal deformation of the valve main body 133 to the movement of the moving portion 143 and further switch the second pressure space from the high-pressure state to the low-pressure state in the short period.

Figure 13:
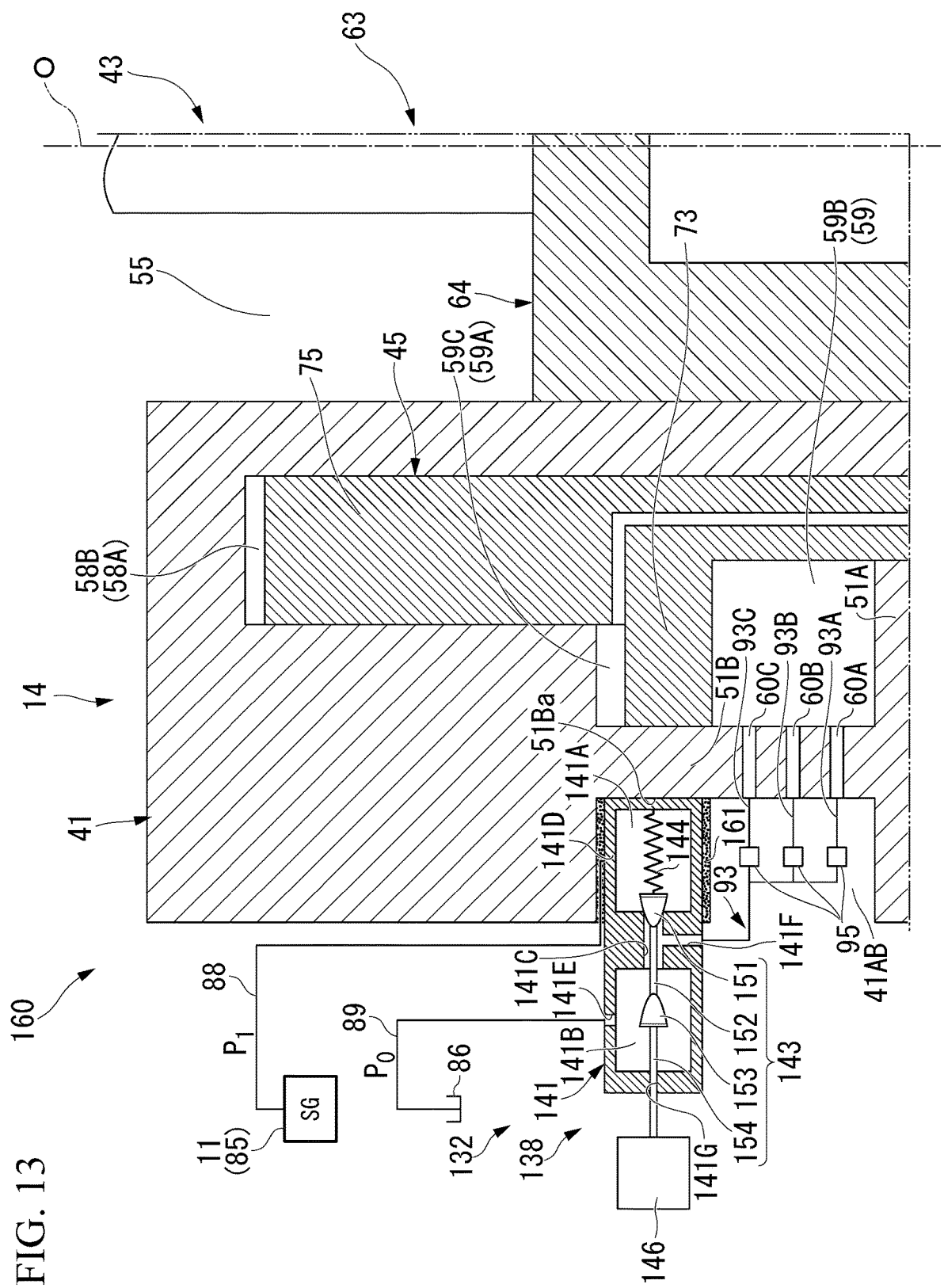
FIG. 13 is a view showing main parts of a steam valve and showing a section of a main body of a steam valve according to a first modification example of the fourth embodiment of the present invention.

Next, a steam valve 150 according to a first modification example of the fourth embodiment will be described with reference to FIG. 13. In FIG. 13, the configurations same with that of the structure body shown in FIG. 3 and FIG. 12 are assigned with same reference signs.

The steam valve 150 has the same configuration with that of the steam valve 13 according to the first embodiment except for having the switching mechanism 132 described in the fourth embodiment instead of the switching mechanism 15 configuring the steam valve 13 and further having a thermal insulation material 161.

The main body portion 141 configuring the switching mechanism 132 is fixed to an outer circumferential surface 51Ba of the first side wall 51B such that the first space 141A is disposed at the valve main body 41 side and the separation direction D coincides with the radial direction with respect to the axis O. The outer circumferential surface 51Ba configures a bottom surface of a concave portion 41AB formed in the valve man body 41. The concave portion 41AB is formed for making the main body portion 141 to approach the second pressure space 59B.

The thermal insulation material 161 is configured to surround the outer circumference of a part of the main body portion 141 that is accommodated inside the concave portion 41AB.

In the steam valve 150 according to the first modification example of the fourth embodiment, by forming the concave portion 41AB for making the main body portion 141 to approach the second pressure space 59B in the valve main body 133 at the outside of the second pressure space 59B, it is possible to dispose the main body portion 141 nearer to the second pressure space 59B. Accordingly, it is possible to switch the second pressure space 59B from the high-pressure state to the low-pressure state in a short period of time.

Also, in the main body portion 141, since the thermal insulation material 161 formed to surround the part of the main body portion 141 that is accommodated inside the concave portion 41AB is provided, the heat of the valve main body 133 may be difficult to be transmitted to the main body portion 141. Accordingly, the negative effects due to the heat of the valve main body 133 to the main body portion 141 and the moving portion 143 can be limited.

In the first modification example of the fourth embodiment, the case of providing the thermal insulation material 161 is described; however, a gap (not shown) instead of the thermal insulation material 161 may be provided. In this case, the same effect of using the thermal insulation material 161 can be achieved.

Figure 14:
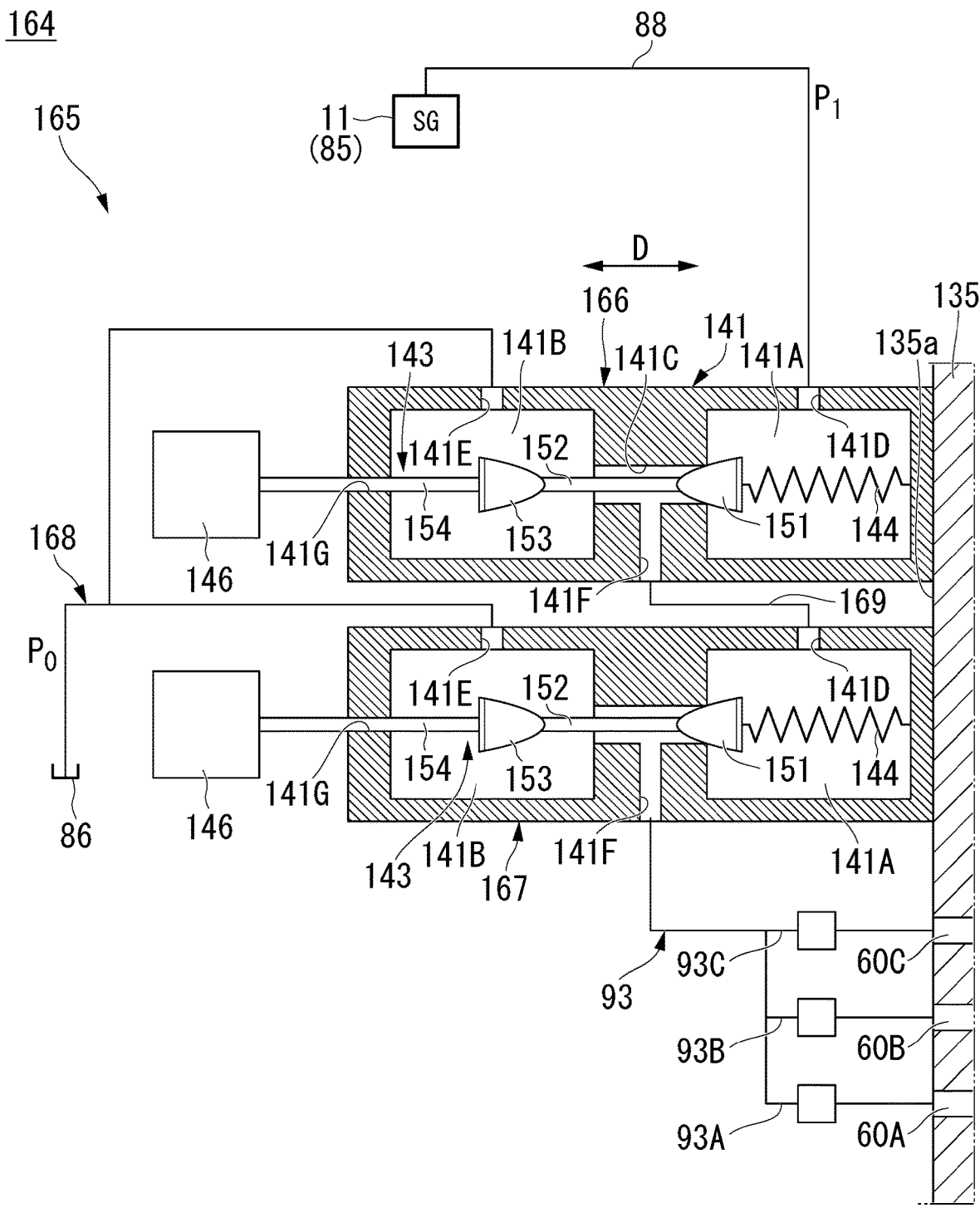
FIG. 14 is a view showing main parts of a steam valve and showing a section of a main body of a steam valve according to a second modification example of the fourth embodiment of the present invention.

Next, a steam valve 164 according to a second modification example of the fourth embodiment will be described with reference to FIG. 14. In FIG. 14, the configurations same with that of the structure body shown in FIGS. 12-13 will be assigned to the same reference signs.

The steam valve 164 has the same configuration with that of the steam valve 130 according to the fourth embodiment except for having a switching mechanism 165 instead of the switching mechanism 132 configuring the steam valve 130.

The switching mechanism 165 has the same configurations with that of the switching mechanism 132 except for that the switching mechanism 165 has a first three-way valve 166, a second three-way valve 167, and a second piping 168 instead of the three-way valve 138 and the second piping 89 configuring the switching mechanism 132, and further has a connection piping 169.

The first three-way valve 166 and the second three-way valve 167 have the same configurations with that of the above-described three-way valve 138. The main body portion 141 configuring the first three-way valve 166 and the second three-way valve 167 are fixed to the outer circumferential surface 135a of the first side wall 135 in the state in which the separation direction D of the first space 141A and the second space 141B coincides with the radial direction of the axis O.

The driving portion 146 configuring the first three-way valve 166 and the second three-way valve 167 is possible to be driven by the same signal, for example.

The first space 141A configuring the first three-way valve 166 is connected to the first piping 88, and the first space 141A is connected to the high-pressure source 85 via the first piping 88.

The second piping 168 is bifurcately branched at one end side. One of the bifurcate branches is connected to the second space 141B configuring the first three-way valve 166. The other of the bifurcate branches is connected to the second space 141B configuring the second three-way valve 167.

The other end of the second piping 168 is connected to the low-pressure source 86.

One end of the connection piping 169 is connected to the hole 141F configuring the first three-way valve 166, and the other end of the connection piping 169 is connected to the supply hole 141D configuring the second three-way valve 167.

The hole 141F is connected to the other end of the third piping 93.

According to the second modification example of the fourth embodiment, the steam valve 164 has the switching mechanism 165 having the first three-way valve 166 and the second three-way valve 167 described above such that even if the state of the first space 141A of the first three-way valve 166 being connected to the high-pressure source 85 is maintained due to the malfunction of the first three-way valve 166, it is possible to close the make the pressure in the second pressure space 59B to be low so as to close the stop valve by using the second three-way valve 167.

As described above, even in the case when the malfunction has occurred in the first three-way valve 166, since the second three-way valve 167 operates normally, it is possible to limit the high-pressure steam from flowing into the second pressure space 59B continuously so as to improve the safety of the steam valve 164.

Fifth Embodiment

Figure 15:
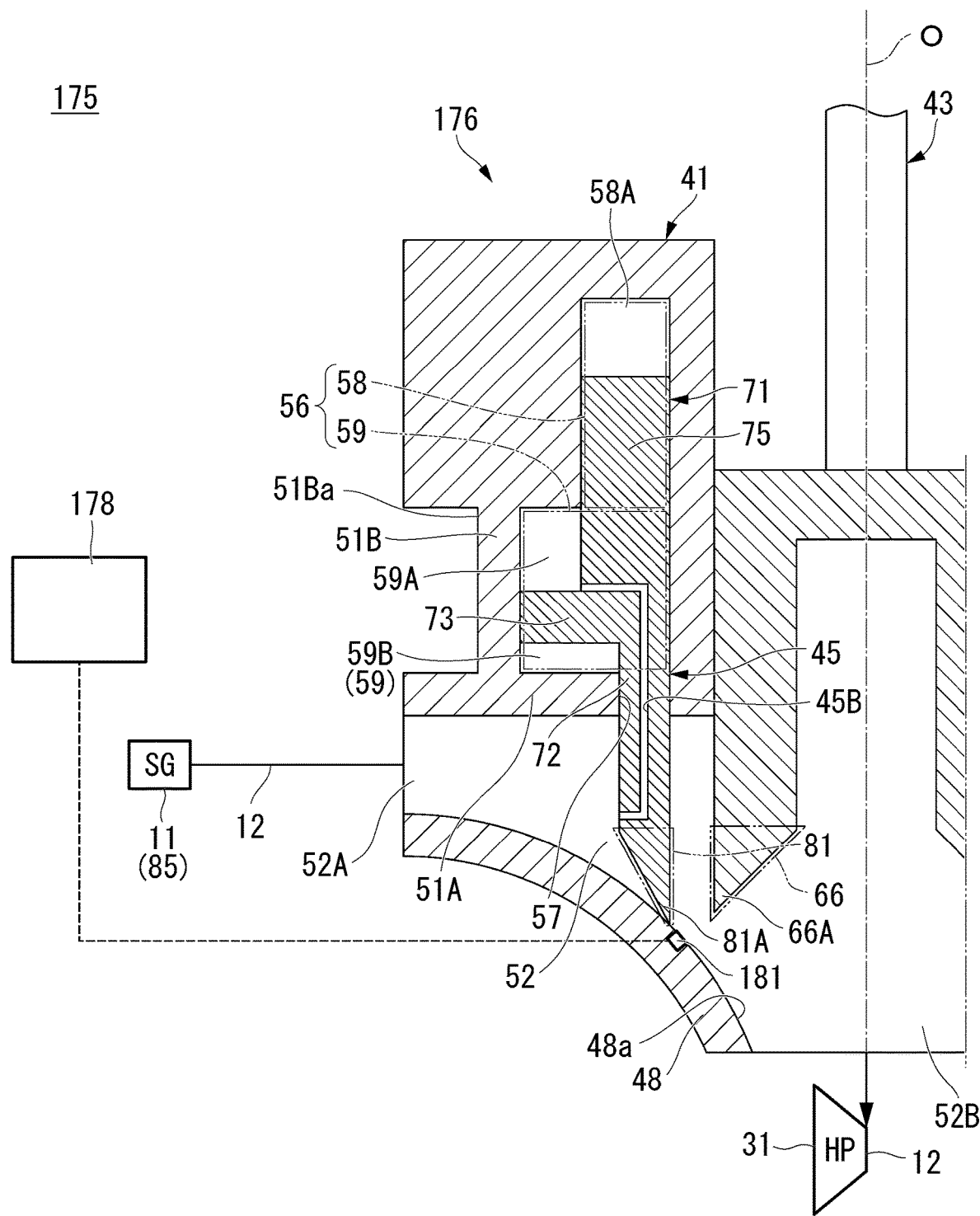
FIG. 15 is a view showing main parts of a steam valve and showing a section of a main body of a steam valve according to a fifth embodiment of the present invention.

A power generation system 175 according to a fifth embodiment of the present invention will be described with reference to FIG. 15. In FIG. 15, the same configurations with that of the structure body shown in FIGS. 1-4 will be assigned to the same reference signs.

The power generation system 175 has the same configurations with that of the power generation system 1 according to the first embodiment except for having a steam valve 176 instead of the steam valve 13 configuring the power generation system 1 and further having a control apparatus 178.

The steam valve 176 has the same configurations with that of the steam valve 13 except for excluding the switching mechanism 15 configuring the steam valve 13 and the plurality of feed/discharge holes 60A-60C but having a flow-rate sensor 181.

The flow-rate sensor 181 is disposed at a position at the downstream side of the stop valve 45 and at the inner side of the valve seat 48. The flow-rate sensor 181 is configured to determine the flow rate of the high-pressing steam flowing at the downstream side of the stop valve 45. The flow-rate sensor 181 is electrically connected to the control apparatus 178. The flow-rate sensor 181 is configured to transmit the information relating to the determined flow rate to the control apparatus 178.

The control apparatus 178 is configured to determine that the malfunction has occurred in the stop valve 45 when the flow-rate sensor 181 determines the flow rate of the high-pressure steam, and the control apparatus 178 is configured to determine that there is no malfunction occurring in the stop valve 45 when the flow-rate sensor 181 does not determine the flow rate of the high-pressure steam (in other words, the flow rate thereof is zero).

Next, an inspection for a steam valve according to the fifth embodiment will be described with reference to FIG. 16. When the process shown in FIG. 16 starts, in Step S1, the regulation valve 43 is opened and the stop valve 45 is closed. In this step, it is unknown whether the stop valve 45 works properly.

Next, in Step S2, the high-pressure steam from the high-pressure source 85 is supplied to the inlet port 52A of the steam flow passage 52, and the flow rate of the high-pressure steam flowing at the downstream side of the stop valve 45 is determined by using the flow-rate sensor 181.

At this time, in the case when the stop valve 45 is closed (no malfunction has occurred in the stop valve 45), since the high-pressure steam does not flow at the downstream side of the stop valve 45, the flow rate sensor 181 cannot determine the flow rate of the high-pressure steam. In this case, the flow rate of the high-pressure steam is zero.

On the other hand, in the case when the stop valve 45 is not closed (any malfunction has occurred in the stop valve 45), the high-pressure steam passes through the space between the stop valve 45 and the valve seat 48. The regulation valve 43 disposed at the downstream side of the stop valve 45 is opened such that the flow-rate sensor 181 determines the flow rate of the high-pressure steam.

Next, in Step S3, the control apparatus 178 determines whether the malfunction has occurred in the stop valve 45 according to the flow rate determined by the flow-rate sensor 181.

Specifically, when the determined flow rate is zero, the control apparatus 178 determines that there is not any malfunction, and when the determined flow rate is a value except for zero, the control apparatus 178 determines that there is a malfunction occurring in the stop valve 45.

Figure 16:
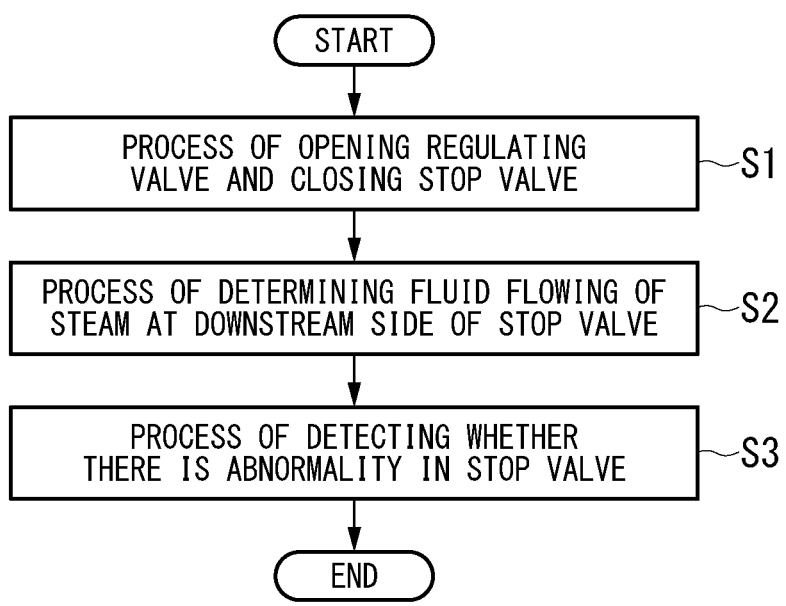
FIG. 16 is a view showing a flowchart for showing an inspection method for a steam valve according to the fifth embodiment of the present invention.

When the determination of Step S3 is finished, the processing shown in FIG. 16 is finished.

According to the inspection method for a steam valve according to the fifth embodiment, according to the processing from Step S1 to Step S3, it is possible to determine whether the malfunction has occurred in the stop valve 45.

Sixth Embodiment

Figure 17:
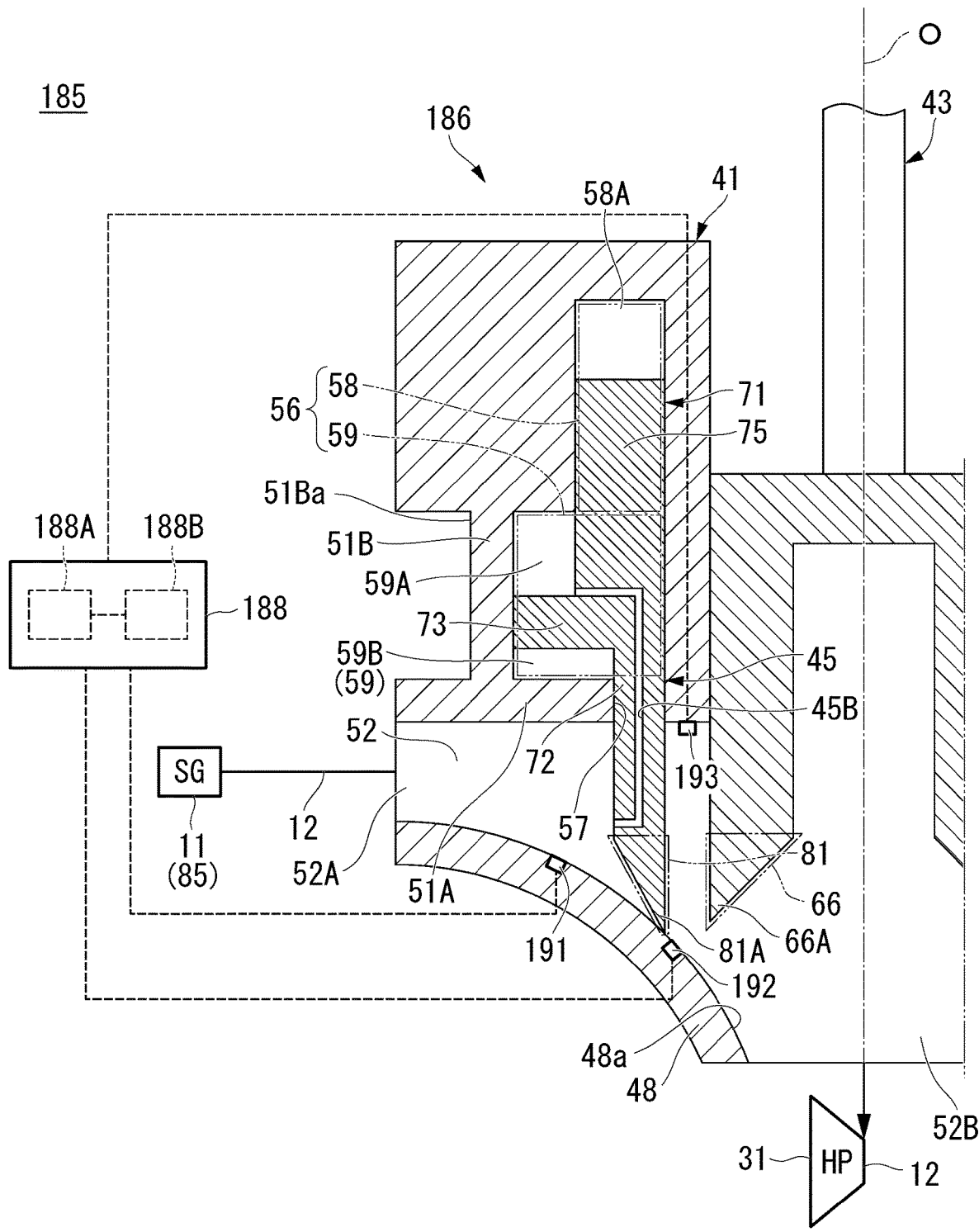
FIG. 17 is a view showing main parts of a steam valve and showing a section of a main body of a steam valve according to a sixth embodiment of the present invention.

A power generation system 185 according to a sixth embodiment will be described with reference to FIG. 17. In FIG. 17, the same configurations with that of the structure body shown in FIG. 15 will be assigned to the same reference signs.

The power generation system 185 has the same configurations with that of the power generation system 175 according to the fifth embodiment except for having pressure sensors 191-193 instead of the flow-rate sensor 181 configuring the steam valve 176 of the power generation system 175 while having a control apparatus 188 instead of the control apparatus 178.

The pressure sensor 191 is disposed at the valve seat 48 at a position at the upstream side of the stop valve 45. The pressure sensor 191 is configured to determine the pressure of the steam flow passage 52 positioned at the upstream side of the stop valve 45 (hereinafter described as "pressure $p_0$").

The pressure sensor 192 is disposed at the valve seat 48 at a position at the downstream side of the regulation valve 43. The pressure sensor 192 is configured to determine the pressure of the steam flow passage 52 positioned at the downstream side of the regulation valve 43 (hereinafter described as "pressure $p_1$").

The pressure sensor 193 is disposed between the stop valve 45 and the regulation valve 43. The pressure sensor 193 is configured to determine the pressure of the steam flow passage 52 positioned between the stop valve 45 and the regulation valve 43 (hereinafter described as "pressure $p_2$").

The pressure sensors 191-193 are electrically connected to the control apparatus 188. The pressure sensors 191-193 are configured to transmit the information relating to the determined pressure $p_0$-$p_2$ to the control apparatus 188.

The control apparatus 188 has a memory portion 188A and a determination portion 188B.

The memory portion 188A is electrically connected with the determination portion 188B. The Equation (5): $M_1=C_1 \cdot A_1 \cdot f(p_0, p_1)$ and Equation (6): $M_2=C_2 \cdot f(St) \cdot f(p_1, p_2)$ used for estimating the aperture area of the stop valve 45 (hereinafter described as "aperture area $A_1$") are stored in the memory portion 188A.

In the Equation (5) and the Equation (6) shown above, $M_1$ represents a mass flow rage of the high-pressure steam (steam) passing through the stop valve 45, $M_2$ represents a mass flow rate of the high-pressure steam (steam) passing through the regulation valve 43, $C_1$ represents a flow rate characteristic of the stop valve 45 acquired in advance, $C_2$ represents a flow rate characteristic of the regulation valve 43 acquired in advance, $A_1$ represents the aperture are of the stop valve 45, St represents a stroke of the regulation valve 43, $p_0$ represents the pressure at the position in the steam flow passage 52 at the upstream side of the stop valve 45, $p_1$ represents the pressure at the position between the stop valve 45 and the regulation valve 43 in the steam flow passage 52, and $p_2$ represents the pressure in the steam flow passage 52 at the position at the downstream side of the regulation valve 43.

The determination portion 188B is configured to estimate the aperture area $A_1$ of the stop valve 45 according to the information relating to the pressure $p_0$-$p_2$ determined by the pressure sensors 191-193 in the state in which the regulation valve 43 is slightly opened and it is assumed that M1 equals to M2 (in other words, $C_1 \cdot A_1 \cdot f(p_0, p_1)=C_2 \cdot f(St) \cdot f(p_1, p_2)$) and the information acquired in advance (more specifically, the flow rate characteristic C1, C2, and the stroke of the regulation valve 43 St).

In this manner, it is possible to estimate the open/close state of the stop valve 45 by estimating the aperture area $A_1$ of the stop valve 45.

Additionally, "the state in which the regulation valve 43 is slightly opened" refers to the opening degree that the steam can pass through.

Next, an inspection method for a steam valve according to the sixth embodiment will be described with reference to FIG. 18.

Figure 18:
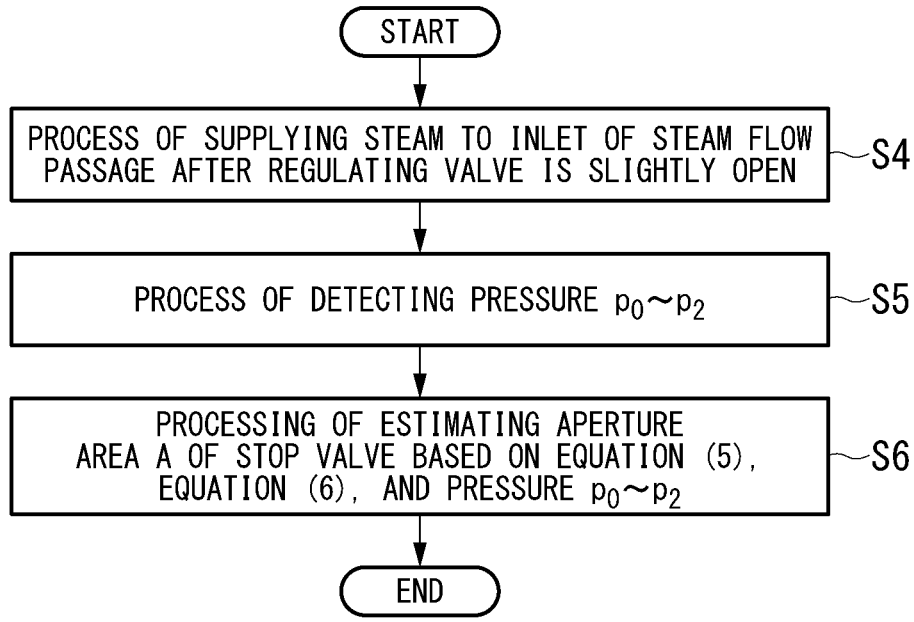
FIG. 18 is a view showing a flowchart for showing an inspection method for a steam valve according to the sixth embodiment of the present invention.

When the process shown in FIG. 18 starts, in Step S4, when the open/close state of the stop valve 45 is unknown and after making the regulation valve 43 into the state of being slightly opened, the high-pressure steam (steam) is supplied to the inlet port 52A of the steam flow passage 52.

At this time, in the case when the stop valve 45 is closed, the high-pressure steam does not flow at the downstream side of the stop valve 45; however, in the case when the stop valve 45 is opened, the high-pressure steam flows at the downstream side of the stop valve 45. Also, since the regulation valve 43 is slightly opened, the high-pressure stem flows at the downstream side of the regulation valve 43.

Next, in Step S5, the pressure $p_0$-$p_2$ are determined using the pressure sensors 191-193 and the information relating to the pressure $p_0$-$p_2$ is transmitted to the control apparatus 188.

Next, in Step S6, in the above-described Equation (5) and Equation (6), the aperture area $A_1$ of the stop valve 45 is estimated according to the information relating to the pressure $p_0$-$p_2$ determined by the pressure sensors 191-193 in the state in it is assumed that M1 equals to M2 and the information acquired in advance (more specifically, the flow rate characteristic C1, C2, and the stroke of the regulation valve 43 St).

In this manner, it is possible to estimate the open/close state of the stop valve 45 by estimating the aperture area $A_1$ of the stop valve 45.

In this manner, it is possible to estimate the open/close state of the stop valve 45 by estimating the aperture area $A_1$ of the stop valve 45 whose open/close state is unknown.

When the process of Step S6 is finished, the process shown in FIG. 18 is finished.

According to the inspection method for a steam valve according to the sixth embodiment, in the above-described Equation (5) and Equation (6), the aperture area $A_1$ of the stop valve 45 is estimated according to the information relating to the pressure $p_0$-$p_2$ determined by the pressure sensors 191-193 in the state in it is assumed that M1 equals to M2 and the information acquired in advance (more specifically, the flow rate characteristic C1, C2, and the stroke of the regulation valve 43 St) such that the open/close state of the stop valve 45 can be estimated.

Seventh Embodiment

An inspection method for a steam valve using a power generation system 185 shown in FIG. 17 will be described with reference to FIG. 17 and FIGS. 19-20.

Figure 19:
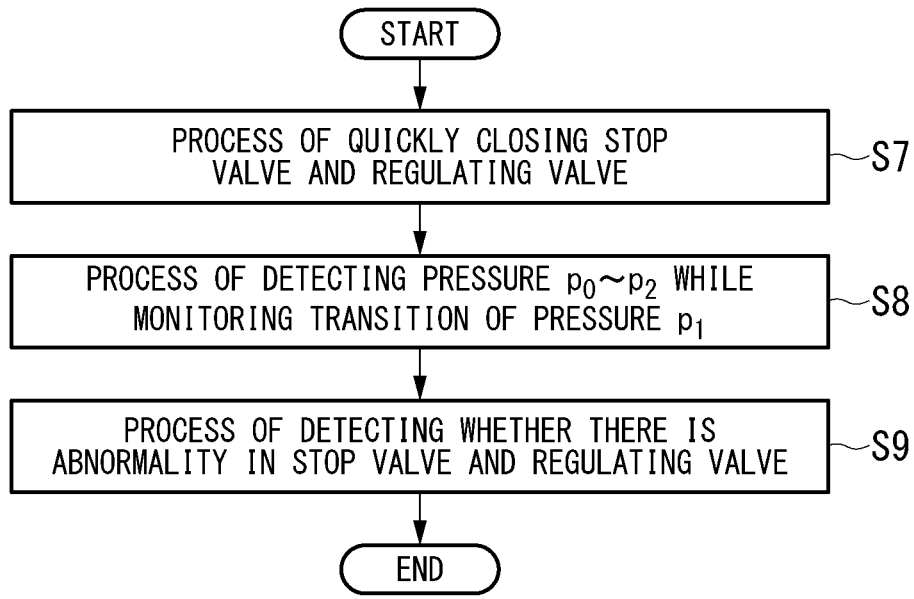
FIG. 19 is a view showing a flowchart for showing an inspection method for a steam valve according to a seventh embodiment of the present invention.

When the process shown in FIG. 19 starts, in Step S7, the stop valve 45 and the regulation valve 43 are rapidly closed.

Next, in Step S8, the pressure $p_1$-$p_2$ are determined and the transition of the pressure $p_1$ is monitored. Immediately after the rapid close, due to the effects of the sequence of the stop valve 45 and the regulation valve 43 to engage with the valve seat and the like, the value of the pressure $p_1$ changes.

Next, in Step S9, the determination for determining whether there is the malfunction in the stop valve 45 and the regulation valve 43 is performed by the determination portion 188B.

Figure 20:
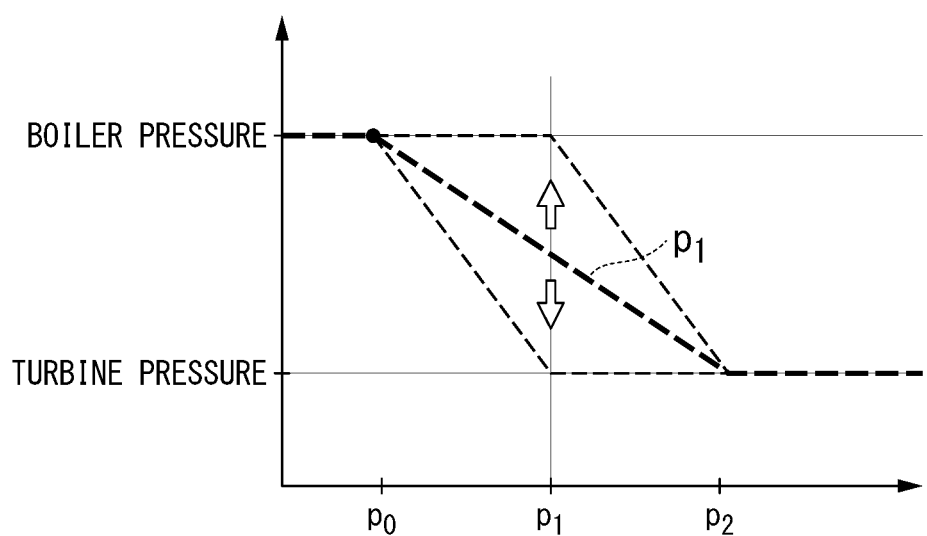
FIG. 20 is a view for showing a determination performed by a control apparatus.

More specifically, in the case in which the pressure $p_1$ changes to approach the pressure of the boiler, it is estimated that a leakage has occurred in the stop valve 45 such that it is determined that a malfunction has occurred in the stop valve 45 (see FIG. 20).

On the other hand, in the case in which the pressure $p_1$ changes to approach the pressure of the turbine, it is estimated that a leakage has occurred in the regulation valve 43 such that it is determined that a malfunction has occurred in the regulation valve 43 (see FIG. 20).

In other cases, it is determined that no malfunctions has occurred in the stop valve 45 and the regulation valve 43.

According to the inspection method for a steam valve according to the seventh embodiment, according to the process described above, at the time of rapid closure, it is possible to estimate whether there is the leakage occurring in the stop valve 45 and the regulation valve 43. Accordingly, it is possible to determine whether the malfunctions has occurred in the stop valve 45 and the regulation valve 43.

Several preferred embodiments of the present invention have been described in detail above, and the present invention is not limited to specific embodiments. Various modifications and changes can be made without departing from the concept of the present invention described in the claims.

REFERENCE SIGNS LIST 1, 175, 185: power generation system
10: steam turbine
11: boiler
12: first steam supply piping
13, 110, 120, 130, 150, 164, 176: stem valve
14, 111, 121, 131: steam valve main body
15, 112, 132, 165: switching mechanism
16: second steam supply piping
18: reheater
21, 45: stop valve
22: regulation valve
25: third steam supply piping
26: generator
31: high-pressure steam turbine
32: middle-pressure steam turbine
33: low-pressure steam turbine
35: rotation shaft
41, 113, 123, 133: valve main body
41AB: concave portion
43: regulation valve
45A: hollow portion
45B: flow passage
48: valve seat
48a: inner surface
51: valve accommodation member
51a, 58a, 64a, 71a: inner circumferential surface
51A: plate-shaped portion
51AB: first groove
51B, 135: first side wall
51Ba, 135a: outer surface
52: steam flow passage
52A: inlet port
52B: outlet port
55: regulation-valve-accommodation space
56: stop-valve-accommodation space
57: penetration portion
58: first accommodation space
58A: low-pressure space
58B: first gap
58b: first opposition surface
58c, 59c, 64b, 71b, 72a, 73c: outer circumferential surface
59: second accommodation space
59a: second opposition surface
59A: first pressure space
59b: bottom surface
59B: second pressure space
59C: second gap
60A-60C, 101A-101E, 102A-102E: feed/discharge hole
63: shaft portion
63A: one end
64: regulation valve main body
66, 81: tip end portion
66a, 81a: inclination surface
66A, 81A: tip end
71: first member
72, 126: second member
73: protrusion portion
73a, 73b: surface
75: base end portion
75a: base end surface
81: tip end portion
85: high-pressure source
86: low-pressure source
88: first piping
89, 168: second piping
91, 138: three-way valve
93, 119: third piping
93A-93C: branch piping
95: throttle
101F: feed/discharge hole group
115: second side wall
115A: penetration hole
116: space
125: first member
126A: second groove
141: main body portion
141A: first space
141B: second space
141C: moving-portion-insertion hole
141D: feed hole
141E: discharge hole
141F: hole
141G: insertion hole
143: moving portion
144: spring portion
146: driving portion
151: first plug body
152, 154: connection shaft
153: second plug body
161: thermal insulation material
166: first three-way valve
167: second three-way valve
169: connection piping
178, 188: control apparatus
181: flow rate sensor
188A: memory portion
188B: determination portion
191-193: pressure sensor
A, C: region
B: feed/discharge hole formation region
D: separation direction
$P_0$-$p_2$: pressure
O: axis

What is claimed is:
1. A steam valve, comprising:
a tubular stop valve, the stop valve being configured to move toward an upper end side along an axial direction when the stop valve is opened and move toward a lower end side along the direction of the axis when the stop valve is closed; and a valve main body configured to accommodate the stop valve while having a valve seat in contact with a tip end of the stop valve, wherein the stop valve has a protrusion portion having a ring shape and configured to protrude outwardly in a radial direction orthogonal to the axial direction, wherein the valve main body has an accommodation space for accommodating the protrusion portion, wherein the accommodation space is divided by the protrusion portion into a first pressure space at an upper side of the protrusion portion and a second pressure space at a lower side of the protrusion portion, wherein a first feed/discharge portion configured to adjust a pressure in the first pressure space and a second feed/discharge portion configured to adjust a pressure in the second pressure space are further provided, wherein the protrusion portion is moved upwardly and downwardly by adjusting the pressure in the first pressure space and the second pressure space, wherein a circumference of the second pressure space is surrounded by a first side wall configuring the valve main body, wherein the first feed/discharge portion is a flow passage formed in the stop valve and the first feed/discharge portion communicates with a steam flow passage formed in the valve main body, wherein the second feed/discharge portion is formed in the first side wall, and the second feed/discharge portion is a plurality of feed/discharge holes communicating the second pressure space with the outside of the second pressure space, wherein the plurality of feed/discharge holes are formed in the axial direction, wherein a switching mechanism is further provided and selectively connects one of a high-pressure source with a pressure higher than that of the first pressure space or a low-pressure source with a pressure lower than that of the steam flowing in the steam flow passage to the second pressure space, wherein the valve main body has:
  a second side wall disposed at the outside of the plurality of feed/discharge holes formation region on which the plurality of feed/discharge holes are formed in the first side wall, wherein a penetration hole is formed on the second side wall; and
  a space communicating the penetration hole and the plurality of feed/discharge holes, and wherein the switching mechanism has:
  a piping having an end connecting with the penetration hole,
  a three-way valve connecting with the high-pressure source, the low-pressure source, and another end of the piping, and
  a throttle disposed on the piping.

2. The steam valve according to claim 1,
wherein the stop valve has a tip end portion and a base end portion, the tip end portion being in contact with the valve seat configuring the valve main body,
wherein the protrusion portion is provided between the tip end portion and the base end portion, and
wherein an aperture area of the plurality of feed/discharge holes decreases from the base end portion side toward the tip end portion side of the stop valve.

3. The steam valve according to claim 1, wherein an aperture diameter of the plurality of feed/discharge holes decreases from the base end portion side toward the tip end portion side of the stop valve.

4. The steam valve according to claim 1,
wherein the valve main body has:
  a first member configured to partition the steam flow passage and has a first groove formed in the first member; and
  a second member configured to be attachable with respect to the first member, wherein a second groove facing the first groove is formed in the second member, and
wherein the first side wall is separated from the first member and the second member, and a position of the first side wall is restricted by being inserted into the first groove and the second groove.

5. The steam valve according to claim 1,
wherein the switching mechanism has:
  a main body portion having a first space connected with the high-pressure source and disposed at the valve main body side and a second space connected with the low-pressure source and disposed at an outside of the first space;
  a moving portion configured to be movable in a separation direction apart from the first space and the second space, wherein the moving portion communicates either of the first space or the second space with the plurality of feed/discharge holes due to the position to which the moving portion is moved; and
  a driving portion configured to move the moving portion in a direction from the second space toward the first space, and
wherein the main body portion is fixed to the valve main body such that the separation direction coincides with the radial direction.

6. The steam valve according to claim 5,
wherein the driving portion switching mechanism is disposed at the outside of the second space in the radial direction, and
wherein the switching mechanism has a spring portion configured to press an end of the moving portion disposed at the valve main body side toward the second space.

7. The steam valve according to claim 5,
wherein the valve main body has a concave portion formed at the outside of the second pressure space and configured to make a part of the main body portion to approach the second pressure space.

8. The steam valve according to claim 7, wherein a gap or a thermal insulation material is disposed between the concave portion and the main body portion.

9. The steam valve according to claim 1,
wherein the switching mechanism has a first three-way valve and a second three-way valve,
wherein each of the first three-way valve and the second three-way valve has:
  a main body portion having a first space and a second space disposed at the valve main body side;
  a moving portion disposed inside the main body portion and configured to be movable in a separation direction apart from the first space and the second space;
  a driving portion configured to move the moving portion in a direction from the second space toward the first space; and
  a spring portion configured to press an end of the moving portion disposed at the valve main body side toward the second space,
wherein the main body portion is directly fixed to the valve main body such that the separation direction coincides with the radial direction, wherein the first space configuring the first three-way valve is connected to the high-pressure source, wherein the first space configuring the second three-way valve communicates with the first space or the second space configuring the first three-way valve due to the position of the moving portion, wherein the second space configuring the first three-way valve and the second space configuring the second three-way valve are connected to the low-pressure source respectively, and wherein either of the first space and the second space configuring the second three-way valve communicates with the second pressure space due to the position of the moving portion.

10. A power generation system, comprising:
the steam valve according to claim 1;
a boiler configured to generate steam;
a steam turbine driven by the steam; and
a steam supply piping configured to connect the boiler and the steam turbine to supply the steam to the steam turbine,
wherein the steam valve is provided in the steam supply piping.

11. An inspection method for a steam valve according to claim 1, wherein the steam valve further has a regulation valve disposed at the inside of the stop valve and configured to be movable in the axial direction, comprising:
a process of making the regulation valve into an opening state while making the stop valve into a close state;
a process of determining a flow rate of steam flowing in a part positioned at the downstream side of the regulation valve in the steam flow passage formed in the valve main body; and
a process of determining that an operation failure has occurred in the stop valve when the flow rate of the steam is not zero.

12. An inspection method for a steam valve according to claim 1, wherein the steam valve further has a regulation valve disposed at the inside of the stop valve and configured to be movable in the axial direction, comprising:
a process of supplying the steam to an inlet port of the steam flow passage formed in the valve main body after opening the regulation valve in a state in which an open/close state of the stop valve is unknown;
a process of determining a pressure at a position at the upstream side of the stop valve in the steam flow passage, a pressure at a position between the stop valve and the regulation valve in the steam flow passage, and a pressure at a position at the downstream side of the regulation valve in the steam flow passage, and
a process of estimating an aperture area $A_1$ of the stop valve according to the three determined pressures and following equations (1) and (2):

$$M_1 = C_1 \cdot A_1 \cdot f(p_0, p_1), \quad \text{Equation (1)}$$

$$M_2 = C_2 \cdot f(St) \cdot f(p_1, p_2), \quad \text{Equation (2)}$$

wherein $M_1$ represents a mass flow rage of the steam passing through the stop valve, $M_2$ represents a mass flow rate of the steam passing through the regulation valve, $C_1$ represents a flow rate characteristic of the stop valve acquired in advance, $C_2$ represents a flow rate characteristic of the regulation valve acquired in advance, $A_1$ represents the aperture are of the stop valve, St represents a stroke of the regulation valve, $p_0$ represents the pressure at the position at the upstream side of the stop valve in the steam flow passage, $p_1$ represents the pressure at the position between the stop valve and the regulation valve in the steam flow passage, and $p_2$ represents the pressure at the position at the downstream side of the regulation valve in the steam flow passage.

13. An inspection method for a steam valve according to claim 1, wherein the steam valve further has a regulation valve disposed at the inside of the stop valve and configured to be movable in the axial direction, comprising: a process of closing the stop valve and the regulation valve; a process of monitoring a change of a pressure in the steam flow passage formed in the valve main body and between the stop valve and the regulation valve immediately after closing the stop valve and the regulation valve; and a process of determining that an operation failure has occurred in the stop valve when the pressure in the steam flow passage approaches the pressure of the boiler, and determining that an operation failure has occurred in the regulation valve when the pressure in the steam flow passage approaches the pressure of the steam turbine.

14. A steam valve, comprising:
a tubular stop valve, the stop valve being configured to move toward an upper end side along an axial direction when the stop valve is opened and move toward a lower end side along the direction of the axis when the stop valve is closed; and
a valve main body configured to accommodate the stop valve,
wherein the stop valve has a protrusion portion having a ring shape and configured to protrude outwardly in a radial direction orthogonal to the axial direction,
wherein the valve main body has an accommodation space for accommodating the protrusion portion and a steam flow passage for the steam to flow,
wherein the accommodation space is divided by the protrusion portion into a first pressure space at an upper side of the protrusion portion and a second pressure space at a lower side of the protrusion portion,
wherein a first feed/discharge portion configured to adjust a pressure in the first pressure space and a second feed/discharge portion configured to adjust a pressure in the second pressure space are further provided,
wherein a circumference of the second pressure space is surrounded by a first side wall configuring the valve main body,
wherein the second feed/discharge portion is formed in the first side wall, and the second feed/discharge portion is a plurality of feed/discharge holes communicating the second pressure space with the outside of the second pressure space,
wherein the plurality of feed/discharge holes are formed in the axial direction,
wherein a switching mechanism is further provided to selectively connect either of a high-pressure source with a pressure higher than that of the first pressure space or a low-pressure source with a pressure lower than that of the steam flowing in the steam flow passage to the second pressure space,
wherein the switching mechanism has:
a main body portion having a first space connected with the high-pressure source and disposed at the valve main body side and a second space connected with the low-pressure source and disposed at an outside of the first space;
a moving portion configured to be movable in a separation direction apart from the first space and the second space, wherein the moving portion communicates either of the first space or the second space with the plurality of feed/discharge holes due to the position to which the moving portion is moved; and a driving portion configured to move the moving portion in a direction from the second space toward the first space, and wherein the main body portion is fixed to the valve main body such that the separation direction coincides with the radial direction.

15. The steam valve according to claim 14, wherein the driving portion is disposed at the outside of the second space in the radial direction, and wherein the switching mechanism has a spring portion configured to press an end of the moving portion disposed at the valve main body side in a direction toward the second space.

16. The steam valve according to claim 14, wherein the valve main body has a concave portion formed at the outside of the second pressure space and configured to make a part of the main body portion to approach the second pressure space.

17. The steam valve according to claim 16, wherein a gap or a thermal insulation material is disposed between the concave portion and the main body portion.

18. The steam valve according to claim 14, wherein the switching mechanism has a first three-way valve and a second three-way valve, wherein each of the first three-way valve and the second three-way valve has:

a main body portion having a first space and a second space disposed at the valve main body side;

a moving portion disposed inside the main body portion and configured to be movable in a separation direction apart from the first space and the second space;

a driving portion configured to move the moving portion in a direction from the second space toward the first space; and a spring portion configured to press an end of the moving portion disposed at the valve main body side toward the second space, wherein the main body portion is directly fixed to the valve main body such that the separation direction coincides with the radial direction, wherein the first space configuring the first three-way valve is connected to the high-pressure source, wherein the first space configuring the second three-way valve communicates with the first space or the second space configuring the first three-way valve due to the position of the moving portion, wherein the second space configuring the first three-way valve and the second space configuring the second three-way valve are connected to the low-pressure source respectively, and wherein either of the first space and the second space configuring the second three-way valve communicates with the second pressure space due to the position of the moving portion.

* * * * *